United States Patent [19]
Abo

[11] Patent Number: 5,586,953
[45] Date of Patent: Dec. 24, 1996

[54] SYSTEM FOR CONTROLLING A CONTINUOUSLY VARIABLE TRANSMISSION IN RESPONSE TO A SENSED WHEEL DECELERATION

[75] Inventor: Keiju Abo, Yokohama, Japan

[73] Assignee: Nissan Motor Co., Ltd., Yokohama, Japan

[21] Appl. No.: 379,058

[22] Filed: Jan. 27, 1995

[30] Foreign Application Priority Data

Jan. 31, 1994 [JP] Japan ................................. 6-010104
Apr. 11, 1994 [JP] Japan ................................. 6-072070

[51] Int. Cl.$^6$ ................................................ B60K 41/12
[52] U.S. Cl. ........................... 477/47; 477/904; 192/4 A
[58] Field of Search ............................ 477/47, 48, 120, 477/904; 474/28; 192/4 A

[56] References Cited

U.S. PATENT DOCUMENTS

| | | | |
|---|---|---|---|
| 3,762,231 | 10/1973 | Pettigren | 474/28 |
| 4,665,775 | 5/1987 | Nagamatsu et al. | 474/28 |
| 4,696,380 | 9/1987 | Kita | 192/4 A |
| 4,735,113 | 4/1988 | Yamamuro et al. | 477/38 |
| 4,784,021 | 11/1988 | Morimoto | 477/47 |
| 4,916,982 | 4/1990 | Suzuki | 474/28 |
| 5,067,372 | 11/1991 | Suzuki | 477/38 |
| 5,069,086 | 12/1991 | Murano et al. | 477/48 |
| 5,109,962 | 5/1992 | Sato | 192/4 A |
| 5,240,094 | 8/1993 | Suzuki | 192/4 A |
| 5,249,482 | 10/1993 | Okahara et al. | 477/48 |

FOREIGN PATENT DOCUMENTS 61-105353  5/1986  Japan .
4-203665  7/1992  Japan .

*Primary Examiner*—Charles A. Marmor
*Assistant Examiner*—Sherry Lynn Estremsky
*Attorney, Agent, or Firm*—Lowe, Price, LeBlanc & Becker

[57] ABSTRACT

In order to improve steering performance and braking performance specifically on a low μ road surface during operation of engine braking, there are provided, in a shift control system of a continuously variable transmission, a sensor for determining a wheel deceleration, and a shift controller for changing a shift pattern adequately. When an engine brake range such as a 2 range or an L range is selected, and the wheel deceleration becomes greater than a predetermined deceleration level, the shift controller changes an upshift limit of the engine brake range, to a smaller transmission ratio. By reducing the transmission ratio in this way, the shift control system can reduce an engine braking force applied to the drive wheels and an inertia torque of the transmission against the driving force applied to the drive wheels by the road surface, so that the wheel speed can readily increase to achieve a desirable degree of wheel slip.

20 Claims, 18 Drawing Sheets

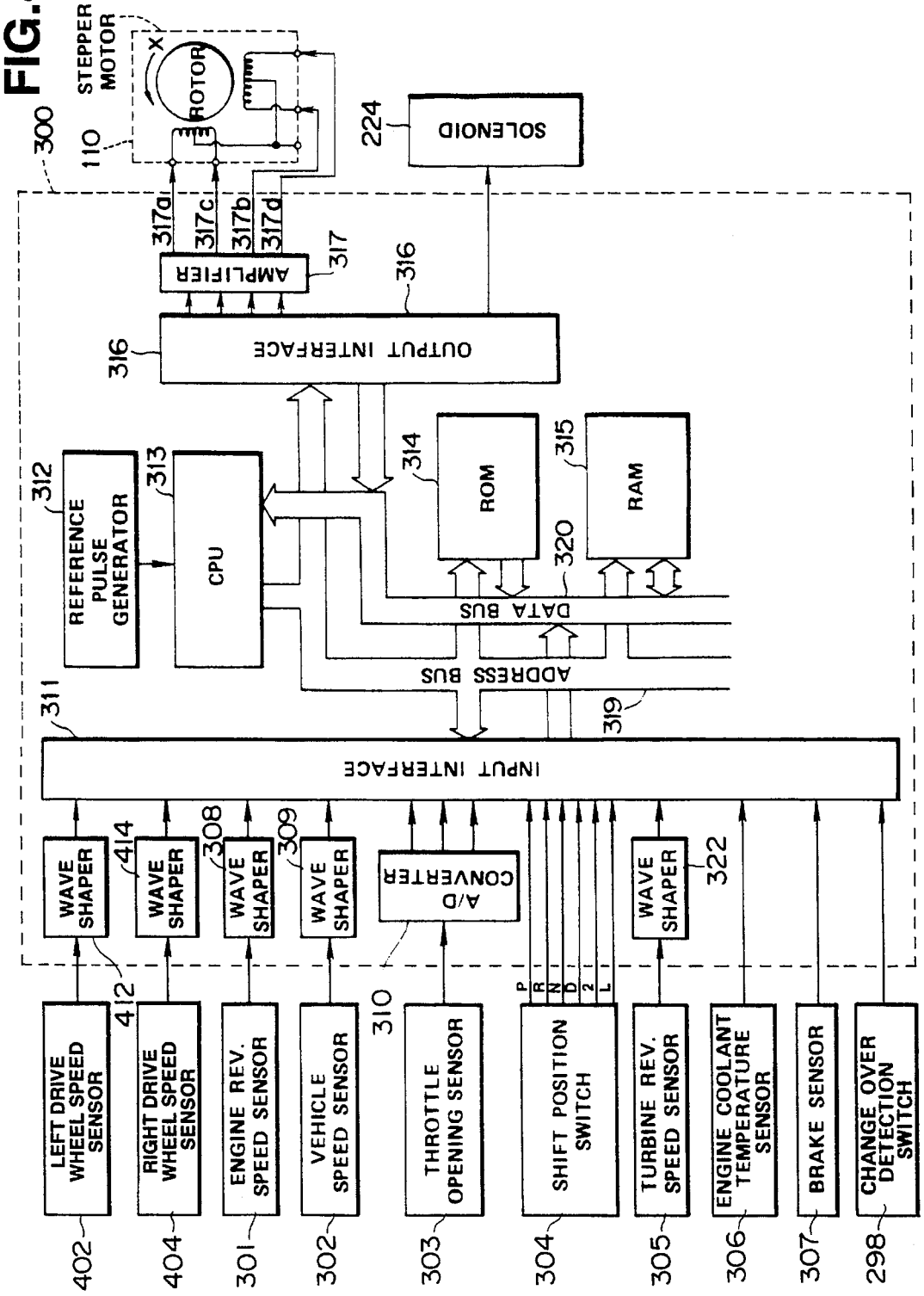

SYSTEM FOR CONTROLLING A CONTINUOUSLY VARIABLE TRANSMISSION IN RESPONSE TO A SENSED WHEEL DECELERATION

FIELD OF THE INVENTION

The present invention relates to a control system for a transmission such as a continuously variable transmission (CVT), and more specifically to a transmission ratio control system suitable for improving steering performance and braking performance, such as stopping time and distance, of a vehicle in particular on a road surface of a low friction coefficient ($\mu$) such as a road surface covered with ice or snow, or a wet tiled road surface.

BACKGROUND OF THE RELATED ART

To vary a transmission ratio between input and output speeds continuously, a CVT of a belt type varies a so-called pulley ratio by varying a radius of contact point between a belt and a pulley. In the case of the belt type CVT because of its nature, it is considered undesirable to provide a means, such as a one way clutch, for limiting the direction of torque transmission as provided in an ordinary automatic transmission composed of a torque converter and a gear system. To vary the pulley ratio, the belt type CVT is arranged to vary the width of a pulley groove formed between a fixed pulley disc and a movable pulley disc by shifting the movable disc relative to the fixed pulley disc by the action of a fluid pressure such as an oil pressure like a piston.

In the transmission of this type, in general, a controller is provided to control the transmission ratio in response to predetermined one or more operating parameters such as the vehicle speed, throttle opening and engine speed, according to a predetermined shift pattern within a transmission ratio control region corresponding to each shift position. The transmission ratio is controlled within a D range transmission ratio control region (or between D range ratio limits) when a normal drive range (such as a D range) is selected, and within an engine brake range transmission ratio region (or between engine brake range ratio limits) when the driver selects an engine brake range (such as 2 range, Ds range, L range or 1 range) which can provide an engine braking effect and which has a minimum transmission ratio greater than the minimum transmission ratio of the normal drive range. When the accelerator pedal is released and the throttle opening is decreased, the controller of this type tends to hold the transmission ratio at a predetermined ratio continuously independent of the actual engine revolving condition. Specifically in a coasting state in which the throttle opening is small and the vehicle speed is relatively high, the transmission ratio is continuously held at the minimum ratio.

On a dry paved road having a high friction coefficient $\mu$, while releasing the accelerator pedal with the intention of decelerating the vehicle by engine braking, the driver may change the shift position from the D range to the engine brake range such as the L range or the 2 range. Before this manual downshift, the transmission ratio is at the minimum ratio of the D range because of the reduction of the throttle opening. Accordingly, the transmission ratio is increased forcibly and abruptly from the minimum ratio of the D range to the minimum ratio of the engine brake range. With this ratio change, a back torque of the engine, or engine brake, is applied, as a braking force, on the drive wheels. If this occurs during a downhill operation, the gravitational acceleration acts on the vehicle body in the direction opposing the decrease of the vehicle body speed (or the vehicle speed), and the transmission ratio is held in the forced state for a relatively long time. During this, therefore, the revolution speed of the input shaft of the CVT varies widely, causing a transient fluctuation of the inertia torque, and there arises the possibility of slip between the belt and pulley.

To prevent such a slip of the belt, a Japanese Patent Provisional Publication S4(1992)-203665 proposes a CVT control system which senses an acceleration acting on the vehicle body, and which, if the sensed acceleration exceeds a predetermined level, restrains the rate of change of the transmission ratio due to the manual downshift from the D range to the engine brake range. This system prevents an abrupt change of the transmission ratio in this way, and thereby prevents the belt slip.

SUMMARY OF THE INVENTION

However, the control system disclosed in the above-mentioned document S4(1992)-203665 is unable to decrease the inertia torque of the transmission against an input from the wheels, and hence insufficient especially on a low friction coefficient road surface.

On such a road surface, the grip of the tire is poor, and the degree of tire (wheel) slip tends to increase beyond a desirable range of tire slip (10~30%, for example) when a braking force is applied. When the engine braking is applied by the manual downshift to the engine brake range with the accelerator pedal being released, the wheels are driven only by the input rotation caused by the inertial motion of the vehicle body and the tires trying to grip the road surface. In the transmission having no one way clutch or other direction limiting means on the output side of the CVT (between the CVT and the drive wheels, that is), this input rotation is transmitted from the drive wheels through the CVT to the input side of the CVT toward the engine. In this case, the CVT is controlled at the minimum ratio of the engine brake range, and the input force from the road must drive the wheels against the great inertia torque of the CVT corresponding to the minimum ratio of the engine brake range. This makes it difficult to regain the wheel speed for optimum wheel slip.

A similar phenomenon occurs also when an anti-skid brake control system decreases the brake actuation force to achieve a desired wheel slip or when a skilled driver performs a so-called pumping brake operation like the anti-skid brake system.

It is therefore an object of the present invention to provide a transmission ratio control system which can improve the steering and braking characteristics of a vehicle specifically on a low friction coefficient road surface by enabling the drive wheels to regain a wheel speed to attain a desired level of wheel slip.

A disengagement of a clutch on the input side of the transmission is effective in order to prevent an engine stall. However, it is not possible to rotate the wheels on the slippery road by disconnection of the drive line between the engine and the drive wheels. The control system according to the present invention holds the engine and drive wheels in the connected state by the drive line, utilizes the drive wheel rotational condition as part of the input to the control, and varies the transmission ratio control region of the engine brake range. In the present invention, it is found that the inertia torque of the transmission can be reduced in this way, and this is effective in improving the braking ability and directional control of a vehicle specifically on a slippery road surface.

BRIEF DESCRIPTION OF THE DRAWINGS

FIG. 4 is a schematic view showing a shift controller which can be employed in the first, second, third and fourth embodiments of the present invention.

DETAILED DESCRIPTION OF THE INVENTION

A first embodiment of the present invention is shown in FIGS. 2–9. A CVT system shown in these figures is similar in basic arrangement to CVT systems disclosed in patent documents; some examples are Japanese Patent Provisional Publication S61(1986)-105353, and U.S. Pat. Nos. 4,735, 113; 5,067,372; 5,240,094; and 5,249,482. The explanations of these documents are incorporated herein by reference, specifically about a CVT mechanism, a control unit, a hydraulic circuit, and a basic shift control procedure.

In the illustrated example, the present invention is applied to an FF (front engine front drive) vehicle in which left and right front wheels are driven by an engine. The vehicle has a brake system comprising a brake pedal, a master cylinder connected with the brake pedal, and wheel cylinders. Each wheel of the vehicle is provided with a unique one of the wheel cylinders for converting hydraulic fluid pressure to mechanical force for actuation of the brake. In this example, the fluid pressure supplied to each wheel cylinder is obtained by equally dividing the master cylinder fluid pressure of the master cylinder. The vehicle of this example is not equipped with an anti-skid brake control system.

Figure 2:
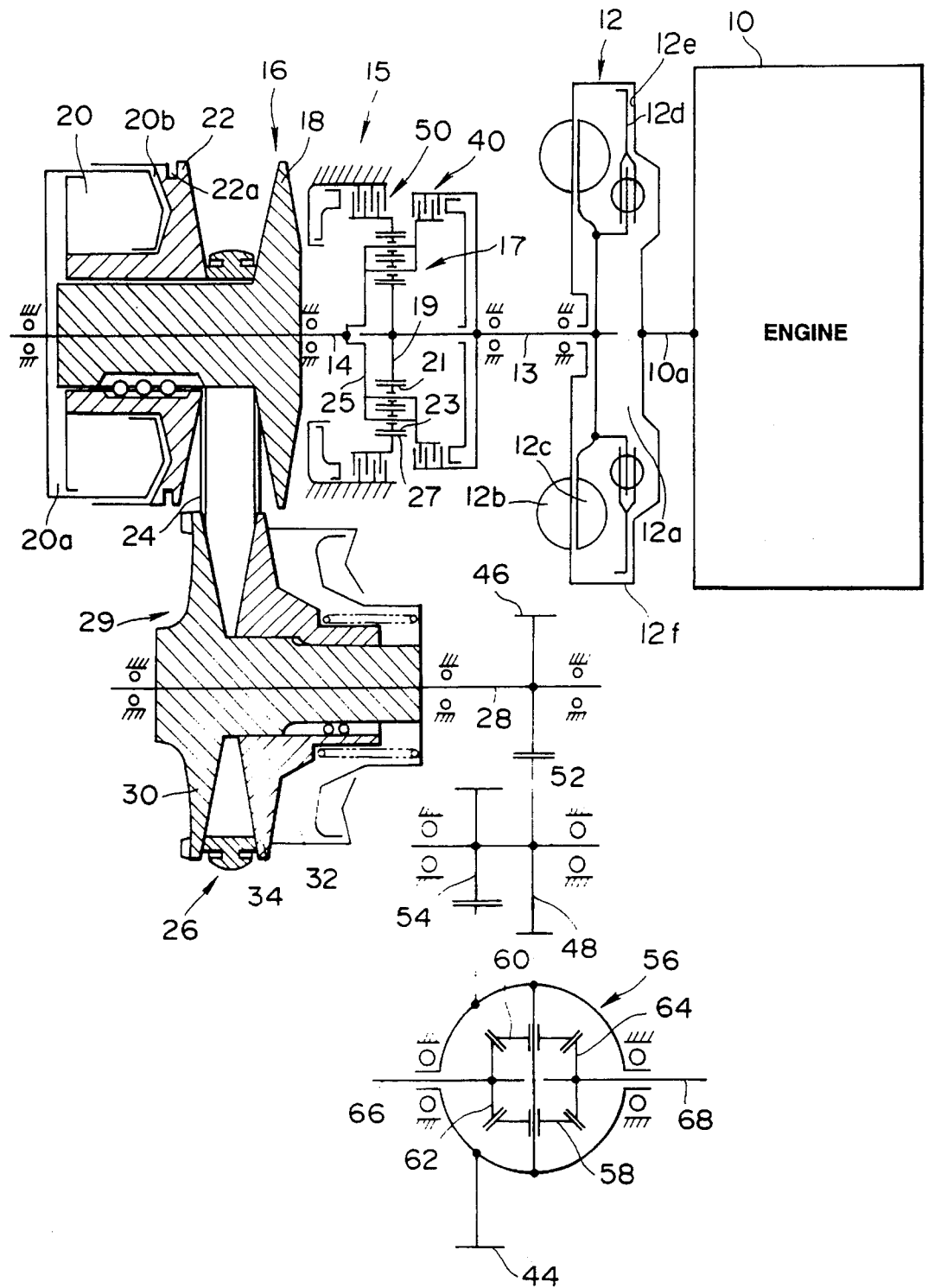
FIG. 2 is a schematic view showing a drive system of a continuously variable transmission system which can be employed in first, second, third and fourth embodiments of the present invention.

FIG. 2 shows a drive system including a continuously variable transmission. This drive system comprises a fluid coupling 12, a forward/reverse change over mechanism 15, a transmission 29 which, in this example, is a V belt type continuously variable transmission (CVT), and a differential unit 56. This CVT system can transmit a rotation of an output shaft 10a of an engine 10 to a pair of output shafts (or drive axle shafts) 66 and 68 at a desired transmission ratio in a desired rotational direction.

The fluid coupling 12 comprises a lockup fluid (oil) chamber 12a, a pump impeller 12b driven by the engine 10, a turbine runner 12c, and a lockup clutch 12d for directly coupling the pump impeller 12b and the turbine runner 12c. The pump impeller 12b and the turbine runner 12b define a fluid circuit so that power is transmitted therebetween by the dynamic fluid action. The turbine runner 12c is connected with the change over mechanism 15 by a rotating shaft (or turbine shaft)13.

The forward/reverse drive direction change over mechanism 15 comprises a planetary gear system 17, a forward clutch 40 and a reverse brake 50. The planetary gear system 17 comprises a sun gear 19, a plurality of double pinion sets each including an inner planet pinion 21 meshing with the sun gear 19 and an outer planet pinion 23 meshing with the inner pinion 21, a planet pinion carrier 25 carrying the planet pinions, and a ring (internal) gear 27 meshing with the outer planet pinions 23. The sun gear 19 is mounted on the turbine shaft 13 and drivingly connected with the turbine runner 12c by the turbine shaft 13. The forward clutch 40 is between the turbine shaft 13 and the planet carrier 25. The reverse brake 50 is between the ring gear 27 and a stationary housing. The planet carrier 25 is drivingly connected with the V belt CVT 29 by a driver shaft 14. The change over mechanism 15 is in the forward drive state when the forward clutch 40 is engaged and the reverse brake 50 is disengaged, and in the reverse drive state when the forward clutch 40 is disengaged and the reverse brake 50 is engaged.

The V belt CVT 29 comprises a driver pulley 16, a follower pulley 26, and a V belt 24 for transmitting power between the pulleys. The driver pulley 16 is mounted on the driver shaft 14, and comprises an axially stationary conical disk 18, a driver pulley cylinder chamber 20 consisting of a first chamber 20a and a second chamber 20b, an axially movable conical disk 22, and a groove 22a. The stationary conical disk 18 and the movable conical disk 22 confront each other and define a V-shaped pulley groove. The follower pulley 26 comprises an axially stationary conical disk 30, a follower pulley cylinder chamber 32, and an axially movable conical disk 34. A V-shaped pulley groove is defined by the disks 30 and 34. The follower pulley 26 is mounted on a follower shaft 28.

There is provided between the CVT 29 and the differential unit 56, a gear set comprising a drive gear 46 mounted on the follower shaft 28, an idler gear 48 mounted on an idler shaft 52 and engaged with the driver gear 46, a pinion gear 54 mounted on the idler shaft 52, and a final gear 44 meshing with the pinion gear 54.

The differential 56 comprises a differential case rotatable with the final gear 44, a differential pinion shaft mounted in the differential case, differential pinion gears 58 and 60 rotatably mounted on the differential pinion shaft, and side gears 62 and 64 mounted on the axle shafts 66 and 68, respectively.

The pressure receiving area of the follower pulley cylinder chamber 32 is made equal to about a half of the pressure receiving area of each of the first and second chambers 20*a* and 20*b* of the driver pulley 16. A line pressure is supplied, as a common operating oil pressure, to the follower cylinder chamber 32 from a hydraulic system shown in FIGS. 3A and 3B. A controlled fluid pressure is supplied from the hydraulic system to each section 20*a* or 20*b* of the cylinder chamber 20 of the driver pulley 16. With this controlled fluid pressure, the driver pulley 16 varies the width of the V shaped pulley groove, and by so doing varies the effective radius of the contact position between the V belt 24 and the driver pulley 16. On the other hand, the width of the V shaped groove of the follower pulley 26 is varied to vary the effective contact point radius, so as to be inversely proportional to the amount of change of the V groove width of the driver pulley 16 while the V belt 24 is gripped without slippage by the follower pulley. In this way, this belt transmission 29 can vary the pulley ratio of the pulleys 16 and 26 corresponding to the transmission ratio continuously.

FIG. 3 shows the hydraulic control system for controlling the fluid pressure.

Figure 3A:
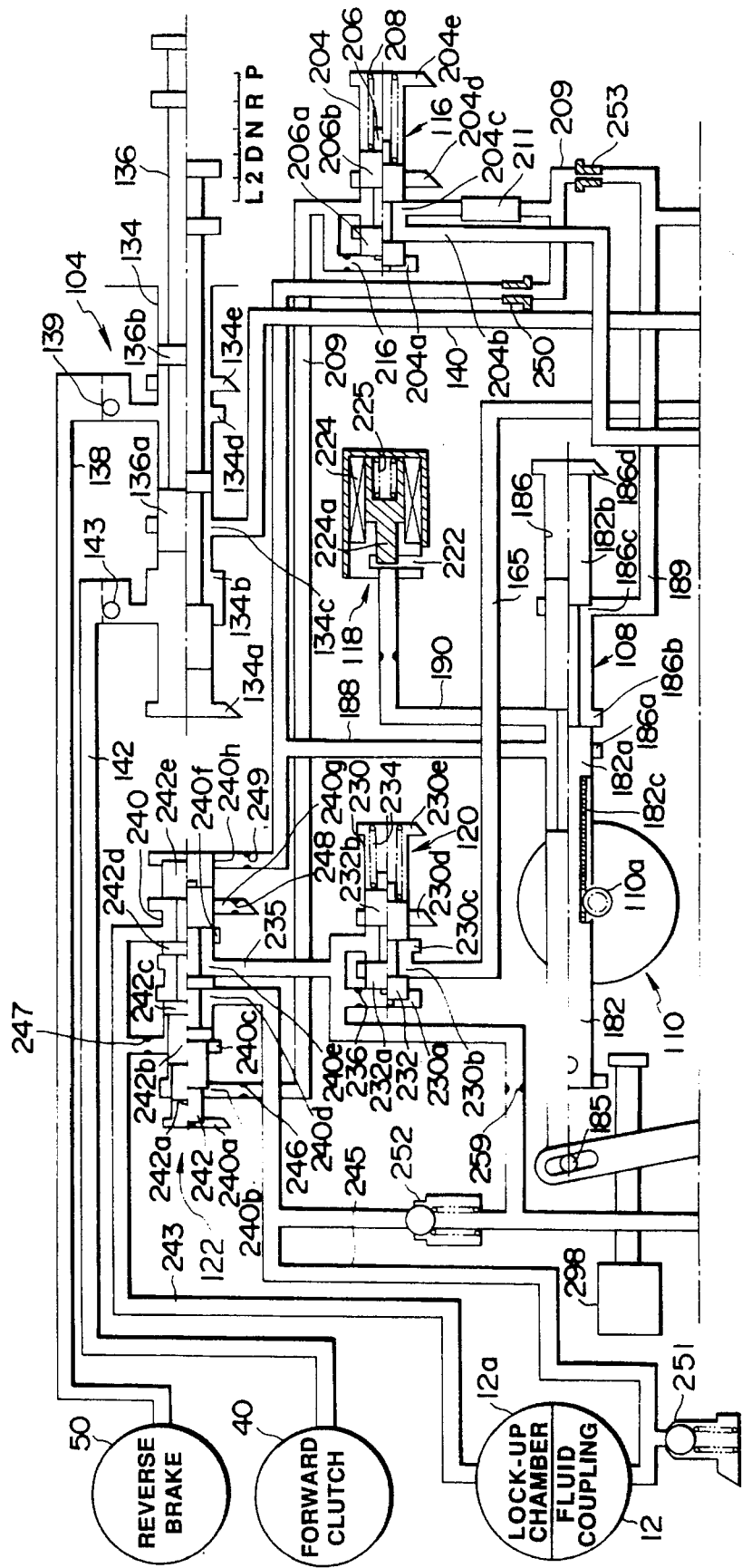
FIGS. 3A and 3B are schematic views showing a hydraulic system which can be employed in the first, second, third and fourth embodiments of the present invention.
Figure 3B:
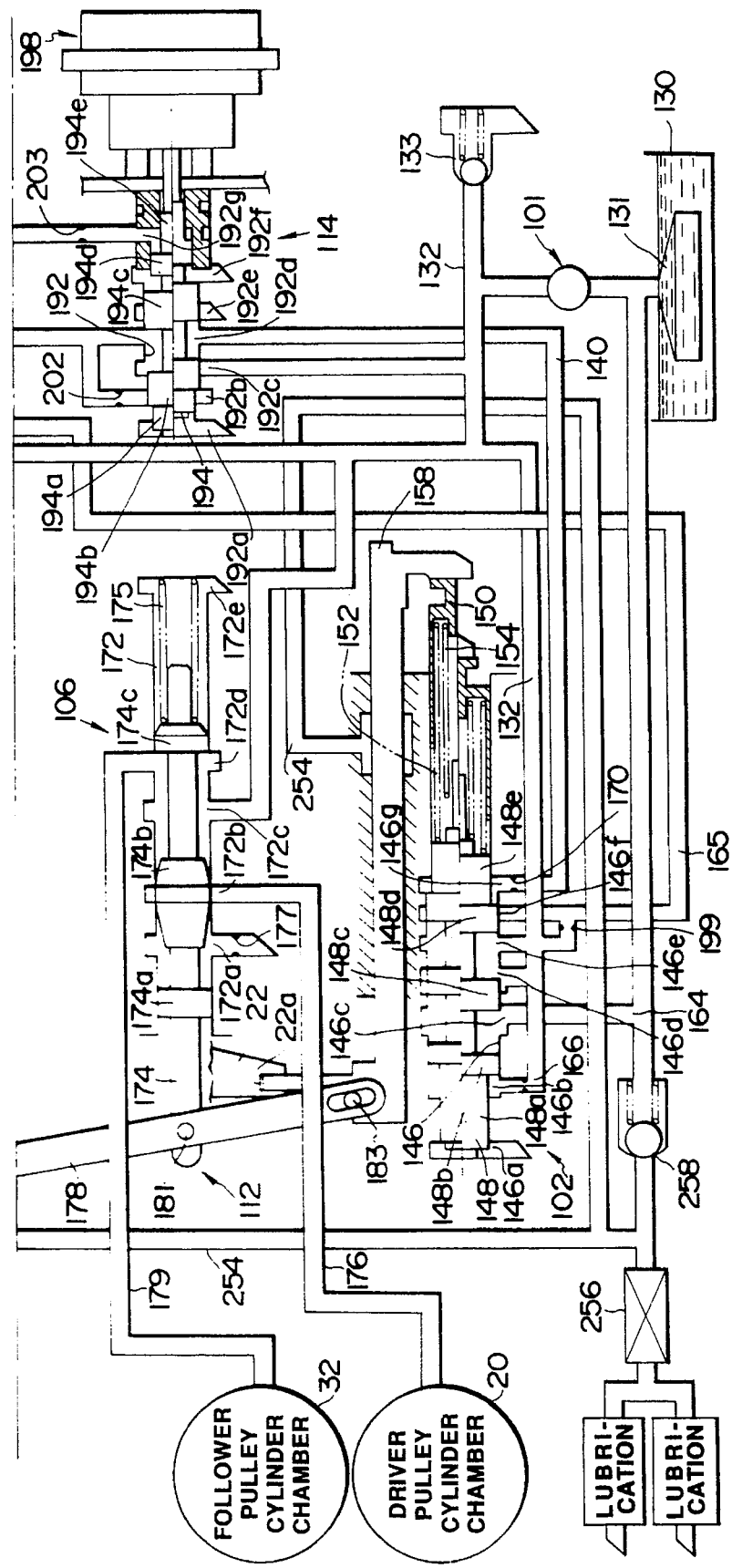

The hydraulic system shown in FIG. 3 comprises a fluid (oil) pump 101, a line pressure regulating valve 102, a manual valve 104, a shift control valve 106, an adjusting pressure selector valve 108, a stepper motor 110, a shift operating mechanism 112, a throttle valve 114, a constant pressure regulating valve 116, an electromagnetic valve 118, a coupling pressure regulating valve 120, and a lockup control valve 122. These components are connected with one another, and with the forward clutch 40, reverse brake 50, fluid coupling 12, lockup chamber 12*a*, driver pulley cylinder chamber 20 and follower pulley cylinder chamber 32, as shown in FIGS. 3A and 3B, in the same manner as in the before-mentioned Japanese Provisional Patent Publication S61-105353, U.S. Pat. Nos. 4,735,113 and 5,067,37 and the other enumerated documents.

In this example shown in FIGS. 3A and 3B, the manual valve 104 has six select positions for L, 2, D, N, R, P ranges. That is, the position for 2 range is interposed between the positions for L and D ranges. A spool 136 is held in one of these six positions. In spite of the addition of the select position for 2 range, the operating fluid pressure in this hydraulic system remains substantially unchanged, but there arises a slight change in operations in a later-mentioned microcomputer.

The fluid pump 101 draws a hydraulic fluid from a reservoir tank 130 through a strainer 131, and discharges the fluid into a fluid line (passage) 132.

The line pressure regulating valve 102 is arranged to generate a line fluid pressure by regulating the fluid pressure supplied from the pump 101. The line pressure regulating valve 102 has ports 146*b*, 146*d*, and 146*e* to which the fluid is supplied from the pump 101 through the fluid line 132. The fluid line 132 is further connected to a port 192*c* of the throttle valve 114, a port 172*c* of the shift control valve 106, a port 204*b* of the constant pressure regulating valve 116, and a relief valve 133.

The manual valve 104 has a valve body formed with a valve bore 134, ports 134*a*–134*e*, and the above-mentioned spool 136 having lands 136*a* and 136*b*. The spool 136 is moved among the six select positions by a select lever (not shown) near a driver's seat. The port 134*b* communicates with the forward clutch 40 via a fluid line 142 having a one way orifice 143. The port 134*d* communicates with the reverse brake 50 via a fluid line 138 having a one way orifice 139. The manual valve 104 controls the fluid pressures supplied to the forward clutch 40 and the reverse brake 50. When the spool 136 is in the P select position or the N select position, the forward clutch 40 and the reverse brake are both disengaged, and power is not transmitted from the turbine shaft 13 to the driver shaft 14. The reverse brake 50 is engaged when the spool 136 is in the R select position, and the forward clutch 40 is engaged when the spool 136 is in the D, 2 or L select position.

The line pressure regulating valve 102 has a valve body formed with seven ports 146*a*–146*g*, a valve bore 146, a spool 148 having lands 148*a*–148*e*, an axially movable sleeve 150, and two concentric springs 152 and 154. A pushing member (transmission ratio transmitting member) 158 is axially slidably supported by the valve body. The pushing member 158 has a first end for pushing the sleeve 150 in the leftward axial direction as viewed in FIGS. 3A and 3B, and a second end has a projecting portion received in the groove 22*a* formed in the outer periphery of the movable disk 22 of the driver pulley 16. The sleeve 150 moves leftward in the figures as the transmission ratio becomes greater, and moves rightward as the transmission ratio decreases. The port 146*g* is in fluid communication with a throttle pressure line 140. The port 146*c* is in communication with a drain line 164. The port 146*f* is in fluid communication via a line 165 with a port 230*b* of the coupling pressure regulating valve 120. The line 165 communicates with the line pressure line 132 through an orifice 199. Orifices 166 and 170 are formed, respectively, in the entrances of the ports 146*b* and 146*g*.

The shift control valve 106 has a valve body formed with a valve bore 172 and five ports 172*a*–172*e*, a spool 174 having lands 174*a*, 174*b* and 174*c*, and a spring 175. A fluid line 176 extends from the port 172*b* to the driver pulley cylinder chamber 20. An orifice 177 is formed in the exit of the port 172*a*. A fluid line 179 extends from the port 172*d* to the follower pulley cylinder chamber 32. When the spool 174 moves leftward, the pressure in the driver pulley cylinder chamber 20 increases to decrease the pulley groove width of the driver pulley 16 and the pulley groove of the follower pulley 26 becomes wider. That is, the V belt contact point radius of the driver pulley 16 increases, the V belt contact point radius of the follower pulley 26 decreases, and as a result, the transmission ratio is decreased. When the spool 174 moves rightward, the transmission ratio is increased.

The shift operating mechanism 112 comprises a lever 178 having a middle portion connected with one end of the spool 174 of the shift control valve 106 by a pin 181, a first lever end connected with the second end of the pushing member 158 by a pin 183, and a second lever end connected with a rod 182 by a pin 185. The rod 182 has a rack 182*c* which is in mesh with a pinion gear 110*a* of the shift motor 110 in the form of the stepper motor.

Under the control of a shift control unit 300 shown in FIG. 4, the stepper motor 110 moves the spool 174 of the shift control valve 106 by moving the rod 182, and by so doing, varies the transmission ratio of the CVT 29.

The selector valve 108 has a valve bore 186, and ports 186*a*–186*d*. The rod 182 serves as a valve element of the selector valve 108. The rod 182 is formed with lands 182*a* and 182*b*. The port 186*a* communicates with a fluid line 188, and the port 186b is in communication via a line 190 with the electromagnetic valve 118. The port 186c communicates with a line 189.

The throttle valve 114 has a valve bore 192, ports 192a~192g, a spool 194 having 194a~194e, and a vacuum diaphragm 198. Orifices 202 and 203 are formed, respectively, in the entrances of the ports 192b and 192g.

The constant pressure regulating valve 116 has a valve bore 204, ports 204a~204e, a spool 206 having lands 206a and 206b, and a spring 208. The ports 204a and 204c are in communication with a fluid line 209 provided with a filter 211. An orifice 216 is formed in the entrance of the port 204a.

The electromagnetic valve 118 has a port 222, a solenoid 224, a plunger 224a, and a spring 225. The control unit 300 controls a duty ratio (or duty factor, or duty cycle) of the solenoid 224.

The coupling pressure regulating valve 120 has a valve bore 230, ports 230a~230e, a spool 232 having lands 232a and 232b, and a spring 234. A fluid line 235 is in communication with the ports 230a and 230c, and an orifice 236 is formed in the entrance of the port 230a.

The lockup control valve 122 has a valve bore 240, ports 240a~240h, a spool 242 having lands 242a~242e. A fluid line 243 extends from the ports 240c and 240f to the lockup chamber 12a. A fluid line 245 extends from the ports 240d to the fluid coupling 12. Orifices 246, 247, 248 and 249 are formed, respectively, in the entrances of the ports 240b, 240c, 240g and 240h.

There are further provided choke type throttle (restrictor) valves 250 and 253, a relief valve 251 in the fluid line 245, and a pressure holding valve 252 in the fluid line 245. A fluid line 254 extends from the pressure holding valve 252 to a cooler 256 for cooling the fluid (oil) for use for lubrication. A cooler pressure holding valve 258 is provided in the line 254. The line 164 extends from this valve 258 to the suck side of the fluid pump 101. The line 254 is connected with the line 235 through an orifice 259. There is further provided a change over detection switch 298.

FIG. 4 shows the shift control unit 300 for controlling the stepper motor 110 and the solenoid 224. In this example, the control unit 300 is an electronic control unit in the form of a microcomputer mounted on the vehicle.

The microcomputer 300 comprises an input interface 311, a reference pulse generator 312, a central processing unit (CPU) 313, a read only memory (ROM) 314, a random access memory (RAM) 315, and an output interface 316, which are connected by an address bus 319 and a data bus 320.

A sensor group supplies input signals to the microcomputer 300. The sensor group of this example comprises an engine revolution speed sensor 301, a vehicle speed sensor 302, a throttle opening sensor 303, a shift position switch 304, a turbine revolution speed sensor 305, an engine coolant temperature sensor 306, a brake sensor 307, the above-mentioned change over detection switch 298, a left drive (front) wheel speed sensor 402, and a right drive (front) wheel speed sensor 404. In the example shown in FIG. 4, the signals from the sensing devices 304, 306, 307 and 298 are inputted directly to the input interface 311 of the microcomputer 300. The signals of the sensing devices 301, 302, 305, 402 and 404 are inputted through wave shapers 308, 309, 310, 322, 412 and 414, respectively, and the signal from the sensor 303 is inputted through an analog-to-digital converter 310.

A control signal to the stepper motor 110 is outputted through an amplifier 317 and signal lines 317a~317d. The microcomputer 300 further outputs a control signal to the solenoid 224.

The shift position switch 304 of this example produces a shift position signal indicating one of the six shift positions of P, R, N D, 2 and L. Each of the drive wheel speed sensors 402 and 404 produces a sinusoidal signal corresponding to the wheel speed of the associated drive wheel, and the corresponding wave shaper 412 or 414 receives this sinusoidal signal and produces a pulse signal representing a sensed drive wheel speed VWL and VWR.

In the present invention, it is possible to determine the vehicle speed V from the wheel speeds of the left and right nondrive wheels. In the case of the front wheel drive vehicle, the vehicle speed V can be set equal to an average (arithmetic mean) of the left rear wheel speed sensed by a left rear wheel speed sensor and the right rear wheel speed sensed by a right rear wheel speed sensor.

Figure 5A:
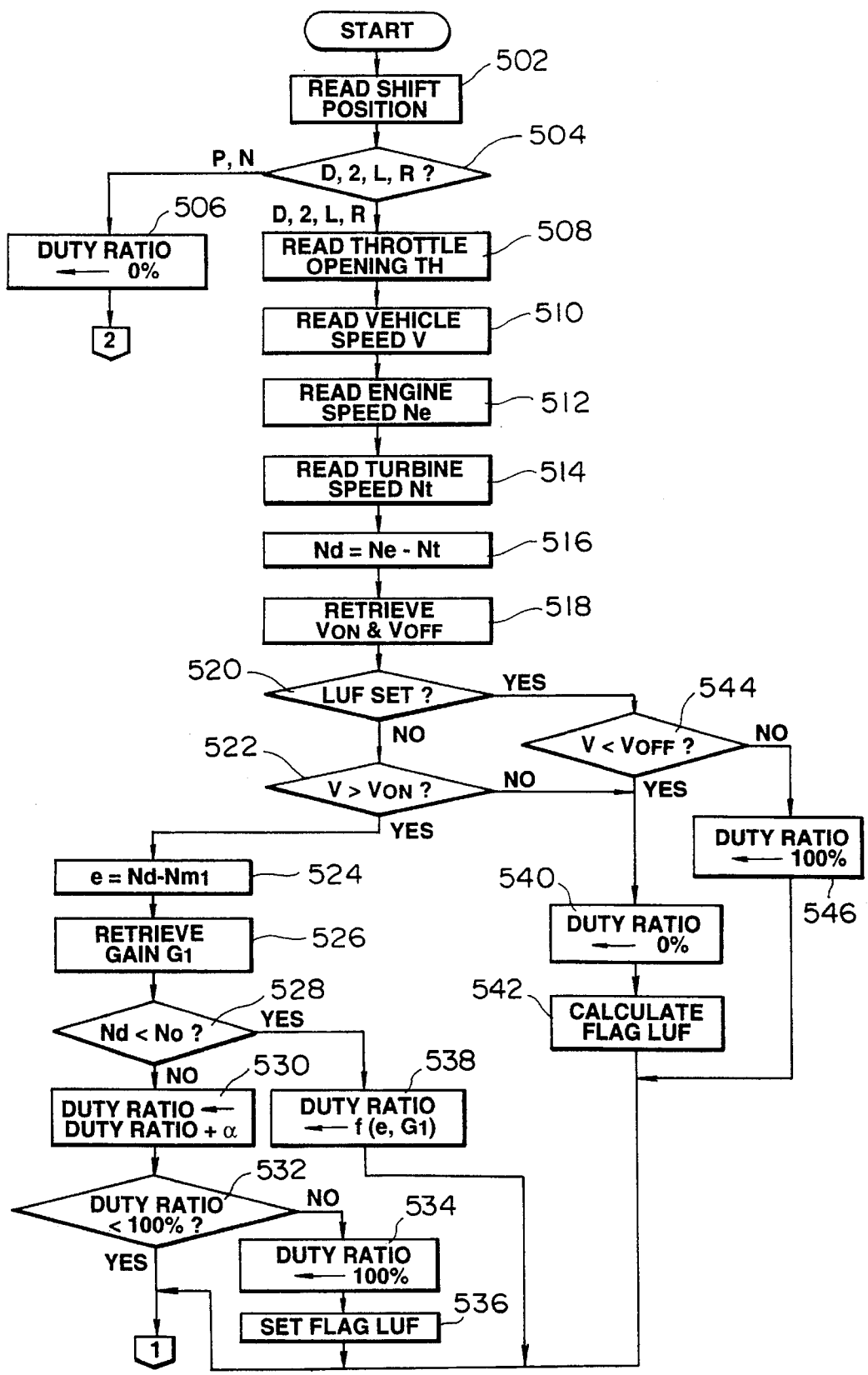
FIGS. 5A and 5B are flowcharts showing a basic shift control procedure which can be employed in the first, second, third and fourth embodiments of the present invention.
Figure 5B:
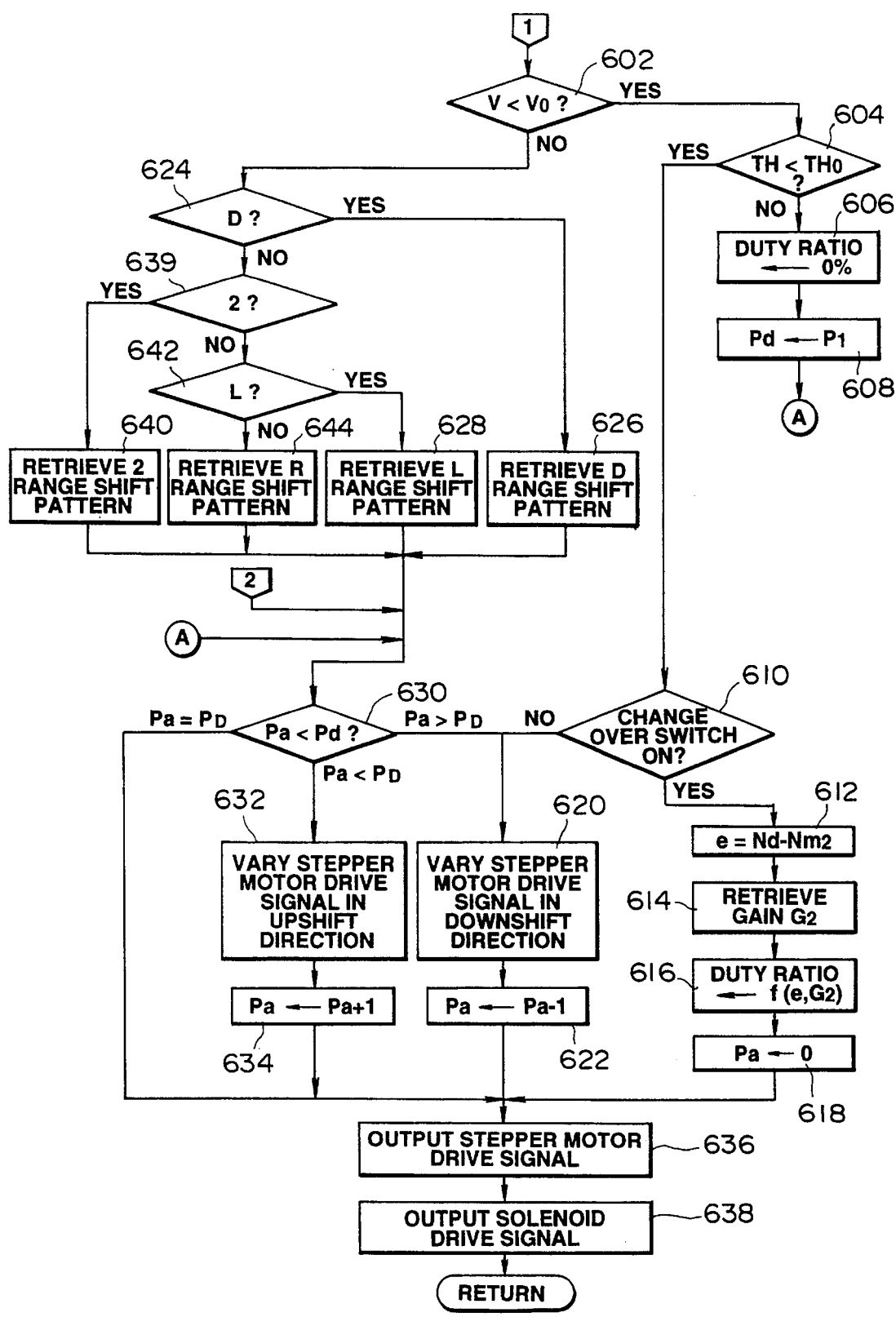

FIGS. 5A and 5B show a basic CVT shift control procedure performed by the microcomputer 300. This control procedure is performed by a timer interrupt periodically at a predetermined time interval ($\Delta T$). According to this procedure, the microcomputer 300 of this example controls the transmission ratio of the CVT 29.

The CPU 313 reads the shift position detected by the shift position switch 304, at a step 502, and determines, at a step 504, whether the shift position is in the D, 2, L or R range. If the shift position is in one of the D, 2, L and R ranges, then the CPU 313 proceeds to a step 508. If the shift position is in the P or N range, then the CPU 313 proceeds to a step 506.

The CPU 313 reads the throttle opening degree TH sensed by the throttle opening sensor 303 at the step 508, reads the vehicle speed V of the signal derived from the vehicle speed sensor 302 at a next step 510, reads the engine speed Ne of the signal derived from the engine speed sensor 301 at a step 512, and reads the turbine speed Nt determined by the turbine speed sensor 305 at a step 514.

Figure 6:
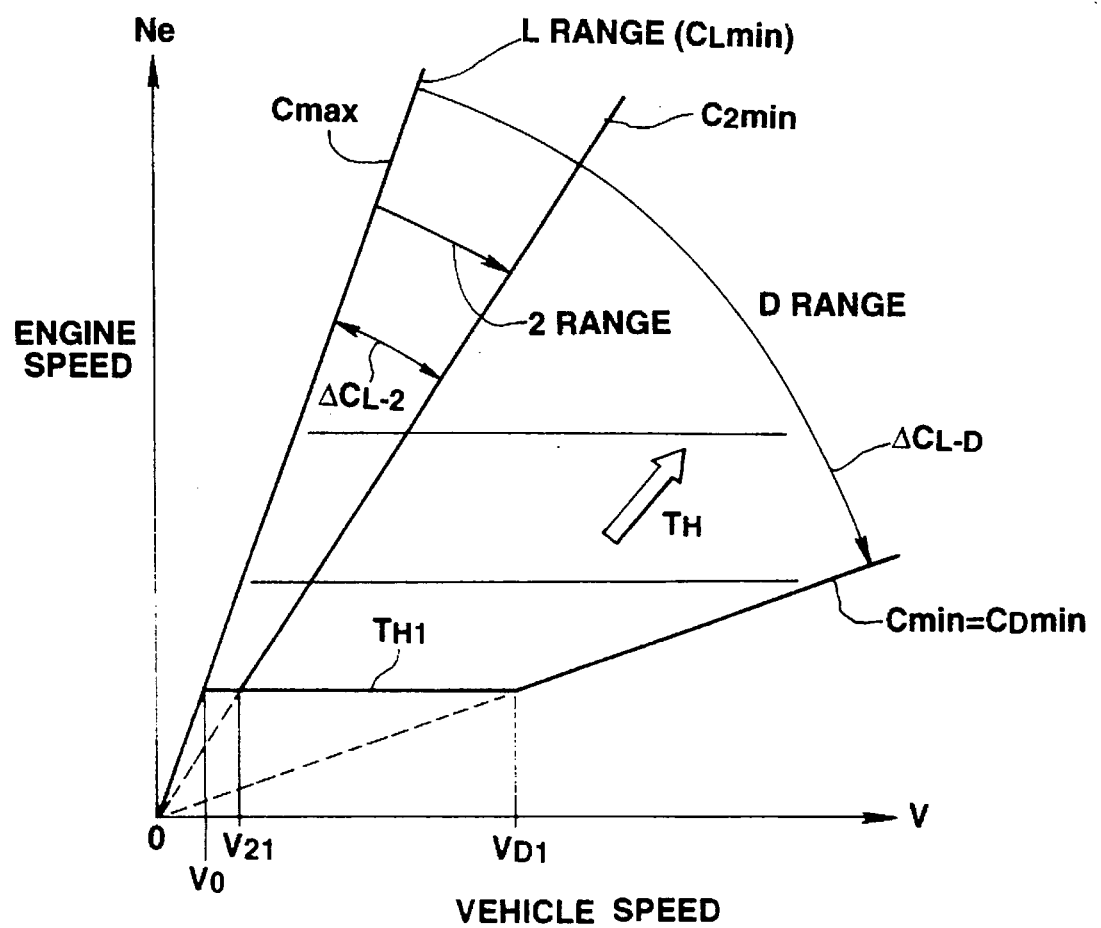
FIG. 6 is a graph for illustrating a shift pattern which can be employed in the first, second, third and fourth embodiments of the present invention.

Then, the CPU 313 calculates a speed deviation Nd between the engine speed Ne and the turbine speed Nt (that is, Nd=Ne−Nt) at a step 516. At a next step 518, the CPU 313 determines a lockup on vehicle speed Von and a lockup off vehicle speed Voff by using a stored control map. Each of the lockup on and off vehicle speeds Von and Voff is a function of the vehicle speed V and the throttle opening degree TH, as shown in FIG. 6 of the U.S. Pat. No. 4,735,113.

At a step 520 following the step 518, the CPU 313 determines whether a lockup flag LUF is set or not. The CPU 313 proceeds to a step 544 if the flag LUF is set, and to a step 522 if it is not. The CPU 313 determines at the step 544 whether the vehicle speed V is lower than the lockup off speed Voff or not. The CPU 313 proceeds to a step 540 if V<Voff, and to a step 546 if V≧Voff. The CPU 313 determines at the step 522 whether the vehicle speed V is higher than the lockup on speed Von, and proceeds to a step 524 if V>Von, and to the 540 if V≦Von.

At the step 524, the CPU 313 calculates a desired deviation e by subtracting a first target value Nm1 from the sensed speed deviation Nd determined the step 516 (that is, e=Nd−Nm1). Then, at a step 526, the CPU 313 determines a first feedback gain G1 corresponding to the desired deviation e by retrieval from a stored control map. The CPU 313 determines at a next step 528 whether the sensed speed deviation Nd is smaller than a control threshold No, and proceeds to a step 530 if Nd<No, and to a step 538 if Nd≧No.

The CPU 313 sets a current duty ratio (or duty factor) equal to a sum obtained by adding a very small predetermined amount α to the previous duty ratio (or duty factor) at the step 530. Then, the CPU 313 determines, at a step 532, whether the thus-determined current duty ratio is smaller than 100%, and proceeds to a step 602 if it is smaller than 100%, and to a step 534 if it is not. The CPU 313 changes the current duty ratio to 100% at the step 534, sets the lockup flag LUF at a step 536, and then proceeds to the step 602. The CPU 313 calculates the current duty ratio from the desired speed deviation e and the first feedback gain G1, according to a predetermined mathematical relationship at the step 538, and then proceeds to the step 602. At the step 540, the current duty ratio is set equal to zero, and then the CPU 313 clears (calculates) the lockup flag LUF at a step 542, and proceeds to the step 602. At the step 546, the current duty ratio is set equal to 100%, and the CPU 313 proceeds to the step 602.

At the step 602, the CPU 313 determines whether the vehicle speed V is lower than a shift control threshold speed Vo. The CPU 313 proceeds to a step 604 if V<Vo, and to a step 624 if V≧Vo. At the step 604, the CPU 313 determines whether the throttle opening degree TH is smaller than an idle judging threshold opening THo. The CPU 313 proceeds to a step 610 if TH<THo, and to a step 606 if TH>THo. At the step 606, the current duty ratio is set equal to 0%. Then, the CPU 313 sets a desired number of pulses Pd equal to a maximum transmission ratio number P1 at a step 608, and proceeds to a step 630. At the step 506, the current duty ratio is set equal to 0%, and the CPU 313 proceeds to the step 630.

At the step 624, it is determined whether the shift position is in the D range. If it is in the D range, then the CPU 313 determines the transmission ratio corresponding to the vehicle speed V and the throttle opening TH by retrieval from a shift pattern for the D range at a step 626, and then proceeds to the step 630. If the shift position is not in the D range, the CPU determines, at a step 639, whether the shift position is in the 2 range.

If the shift position is in the 2 range, then the CPU 313 determines the transmission ratio corresponding to the vehicle speed V and the throttle opening TH by retrieval from a shift pattern for the 2 range at a step 640, and then proceeds to the step 630. If the shift position is not in the 2 range, then the CPU 313 determines, at a step 642, whether the shift position is in the L range. If shift position is in the L range, then the CPU 313 determines the transmission ratio corresponding to the vehicle speed V and the throttle opening TH by retrieval from a shift pattern for the L range at a step 628, and then proceeds to the step 630. If the shift position is not in the L range, then the CPU 313 determines the transmission ratio corresponding to the vehicle speed V and the throttle opening TH by retrieval from a shift pattern for the R range at a step 644, and then proceeds to the step 630.

At the step 610, the CPU 313 determines whether the change over detection switch 298 is in the on state or not. The CPU 313 proceeds to a step 612 if it is on, and to a step 620 if it is not. At the step 612, the CPU 313 calculates the desired speed deviation e by subtracting a second target value Nm2 from the sensed speed deviation Nd (that is, e=Nd−Nm2). Then, the CPU 313 determines a second feedback gain G2 corresponding to the thus-determined deviation e, by retrieval from a stored control map. Then, the CPU 313 determines the current duty ratio from the deviation e and the second feedback gain G2 according to a predetermined mathematical relationship, at a step 616, sets the current number of pulses Pa for the stepper motor 110 equal to zero at a step 616 (Pa←0), and proceeds to a step 636.

At the step 630, the CPU 313 compares the current number Pa of pulses with the desired number Pd. The CPU proceeds to a step 636 if Pa=Pd, to a step 632 if Pa<Pd, and to the step 620 if Pa>Pd. If Pa<Pd, the CPU 313 varies a stepper motor drive signal in an upshift direction at the step 632, updates the current number Pa of pulses by adding one to the current number Pa (Pa←Pa+1), and proceeds to the step 636. If Pa>Pd, the CPU 313 varies the stepper motor drive signal in a downshift direction at the step 620, updates the current number Pa of pulses by subtracting one from the current number Pa (Pa←Pa−1), and proceeds to the step 636.

At the step 636, the stepper motor driver signal is outputted, and then the CPU 313 further outputs the solenoid drive signal at a step 638 and returns to a main program.

In this example, excluding the shift pattern of the R range, each of the normal shift patterns for the D, 2 and L ranges used in the steps 626, 640 and 628 is approximately in the form of a pattern shown in FIG. 6. In each of these normal shift patterns of the D, 2 and L, the CPU 313 can uniquely determine the transmission ratio by retrieving a transmission ratio value corresponding to the vehicle speed V and the throttle opening TH from the control map of the transmission ratio having the vehicle speed V and the throttle opening TH as arguments. When the pattern of FIG. 6 is considered to be a total control map of a shift pattern in which the vehicle speed V is expressed along the horizontal axis, the engine speed Ne is expressed along the vertical axis, and the throttle opening TH is a parameter, then the transmission ratio is regarded as constant along a straight line having a constant slope and passing through the origin. A steepest straight line passing through the origin and having the largest slope in all the regions of the shift patterns represents a maximum transmission ratio Cmax corresponding to a maximum overall speed reduction ratio of the vehicle. A most gradual straight line passing through the origin and having a smallest slope represents a minimum transmission ratio Cmin corresponding to a minimum overall reduction ratio of the vehicle. The minimum ratio Cmin is equal to a minimum ratio CDmin of the D range.

A minimum ratio (normal limit ratio) C2min of the 2 range is normally greater than the D range minimum ratio CDmin. In this example, this (normal) 2 range minimum ratio C2min is smaller than the maximum ratio Cmax. The slope of the straight line representing the (normal) 2 range minimum ratio C2min is intermediate between the slopes of the steepest straight line of Cmax and the most gradual straight line of Cmin as shown in FIG. 6. In the case of the 2 range, the transmission ratio is controlled in accordance with the engine and vehicle operating parameters such as TH and V between the maximum ratio Cmax and the (normal) 2 range minimum ratio C2min. The (normal) 2 range minimum ratio C2min is an upshift limit of the normal 2 range beyond which the transmission ratio is prevented from being decreased. The transmission ratio is controlled to be equal to or greater than this 2 range upshift limit. In the shift pattern of the normal 2 range, the transmission ratio varies with time along a control curve in accordance with the vehicle speed V and the throttle opening TH, between the maximum ratio Cmax and the normal 2 range minimum ratio C2min.

A minimum ratio (normal limit ratio) CLmin of the L range of this example is equal to the maximum ratio Cmax. That is, the shift pattern of the normal L range is fixed at the maximum transmission ratio Cmax independently of the vehicle speed V and the throttle opening TH. In the normal L range, the transmission ratio is maintained constant at the maximum ratio Cmax. In this example, the upshift limit of the L range is normally set equal to the maximum ratio Cmax.

The minimum ratio CDmin of the D range is equal to the overall minimum ratio Cmin. In the D range, the transmission ratio is controlled in accordance with the engine and vehicle operating parameters between the maximum ratio Cmax and the minimum ratio Cmin (=CDmin). In the shift pattern of the D range, the transmission ratio varies with time along a control curve in accordance with the vehicle speed V and the throttle opening TH between the maximum ratio Cmax and the D range minimum ratio CDmin. The control system can decrease the transmission ratio below the 2 range normal upshift limit C2min, up to the overall minimum ratio Cmin.

In FIG. 6, an L–2 upshift limit difference ΔCL–2 is a difference between the normal minimum ratio CLmin (=Cmax) and the normal 2 range minimum ratio C2min. That is; ΔCL–2=CLmin–C2min. An L–D upshift limit difference –CL–D is a difference between the normal L range minimum ratio CLmin (=Cmax) and the D range minimum ratio CDmin. That is; ΔCL–D=CLmin–CDmin.

In the region in which the vehicle speed V is lower than the shift control threshold speed Vo, the transmission ratio (that is, the shift pattern) is fixed at the maximum ratio Cmax without regard to the ranges of the shift positions. This threshold vehicle speed Vo is an upper limit of a creep control for controlling a creep appearing in a vehicle equipped with an automatic transmission (AT). A shift control threshold throttle opening TH1 is a value of the throttle opening TH at the maximum ratio Cmax when the vehicle speed is equal to Vo. A normal 2 range minimum ratio vehicle speed V21 is a value of the vehicle speed V providing the normal 2 range minimum ratio C2min at the threshold opening TH1. A D range minimum ratio vehicle speed VD1 is a value of the vehicle speed V providing the D range minimum ratio CDmin at the threshold opening TH1. These minimum ratio vehicle speeds V21 and VD1 are simply referred to as a normal range minimum ratio vehicle speed Vj1. These upper limits of the creep control can be determined appropriately to correspond to a later-mentioned control to ensure the wheel speed. It is possible to exclude these upper limits of the creep control when the wheel speed is not ensured on a low μ road surface, for example.

The control system of this embodiment is based on the following principle.

In this example, each of the 2 range and the L range is called an engine brake range. The minimum transmission ratio of each engine brake range, that is the normal L range minimum ratio CLmin or the normal 2 range minimum ratio C2min is greater than the minimum ratio CDmin of the D range. In other words, the minimum ratio of each engine brake range corresponds to a greater vehicle reduction ratio, and the D range minimum ratio CDmin corresponds to a smaller vehicle reduction ratio. Therefore, in the state in which one of these engine braking ranges is selected, and the throttle opening becomes small by a release of the accelerator pedal as in coasting operation, the braking force applied to the drive wheels due to engine brake is greater than that obtained in the coasting operation in the D range. In this case, the drive wheels are kept rolling, against the large braking force from the engine, by the driving force applied from the road surface due to the tire grip and the vehicle body speed.

On the other hand, the CVT has a greater inertia torque against the above-mentioned driving force from the road surface in the state in which the transmission ratio is controlled at the normal minimum ratio of one of the engine braking ranges than in the case of the minimum ratio of the D range. Namely, the driving force from the road surface must rotate the drive wheels against this great inertia torque. However, the tire grip force is small on a slippery, low μ road surface, and moreover the actual slip rate exceeds the desired slip rate, further reducing the gripping ability of the tires. On the low μ road surface, therefore, the driving force from the road surface is very small. As a result, in the vehicle having the CVT controlled at the normal minimum ratio of an engine braking range, it can be difficult to keep the speeds of the drive wheels in a desired wheel speed range to fulfill a requirement of the desired slip rate, or to return the drive wheel speeds to the desired wheel speed range by increasing the wheel speeds. This problem can occur in a downshift operation, a coast running state with an engine braking range, and all other cases in which the driving force transmitted from the engine to the drive wheels is insufficient because of the depression degree of the accelerator pedal being small or null. In the case of intentional braking operation by depression of the brake pedal or control operation of an anti-skid brake control system, this problem can occur likewise if the drive wheel speed becomes lower than a desired wheel speed level required to hold the degree of wheel slip within a desirable range of wheel slip.

Figure 7:
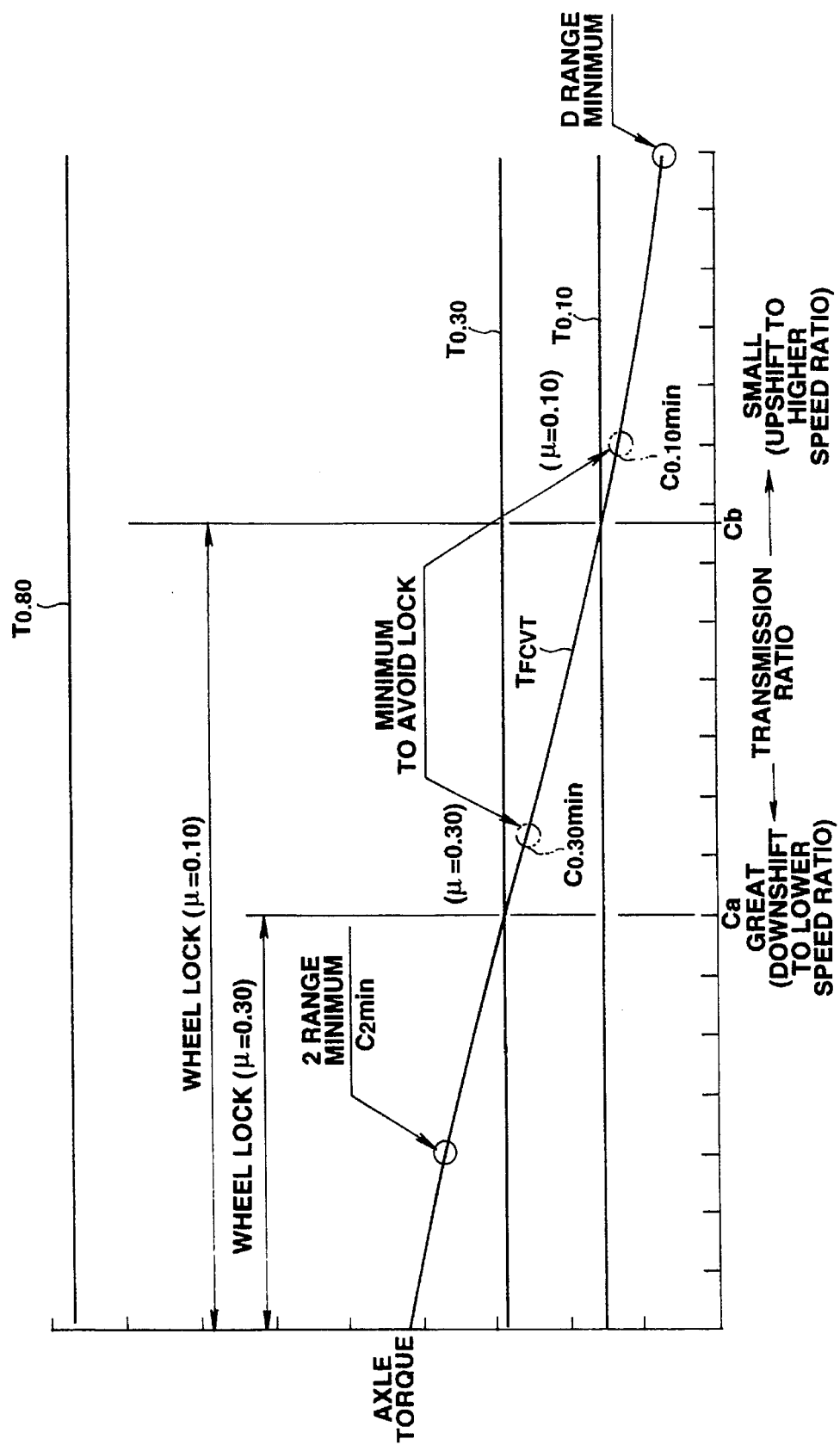
FIG. 7 is a graph for illustrating an underlying principle of the present invention.

This problem is graphically illustrated in FIG. 7. In this figure, the inertia torque of the CVT is converted to an axle torque required for axle revolution, and expressed as TFCVT. The driving force from the road surface at a static friction coefficient μ between each tire and the road surface is calculated in terms of an axle torque required for axle revolution, and expressed as Tμ such as T0.80, T0.30 and T0.10. As evident from FIG. 7, the driving force Tμ of the road decreases when the friction coefficient μ of the road surface become low. The inertia torque TFCVT of the CVT decreases as the transmission ratio of the CVT becomes smaller. The CVT inertia torque TFCVT reaches a minimum value when the minimum transmission ratio of the D range (normal driving range) is set. As compared to this minimum value of TFCVT, the value of the CVT inertia torque TFCVT at the minimum ratio C2min of the 2 range is considerably great.

In the case of the road surface friction coefficient μ being about 0.80, the characteristic curve of the road driving force T0.80 does not decrease below the curve of the CVT inertia torque TFCVT. Therefore, the drive wheels do not lock on the road surface of such a high friction coefficient even when the CVT transmission ratio is controlled at the minimum ratio of each engine braking range.

However, the road driving force curve T0.30 of a friction coefficient of about 0.30 become lower than the CVT inertia torque curve TFCVT in a region in which the transmission ratio is relatively great. This region where the transmission ratio is equal to or greater than Ca, can be referred to as a wheel (drive wheel) lock region. In the case of a friction coefficient of about 0.10, the road driving force curve T0.10 intersects the CVT inertia torque curve TFCVT at a fairly low ratio Cb, so that T0.10 is lower than TFCVT in a wider region. The wheel (drive wheel) lock region of μ of 0.10 is much wider than the wheel lock region of μ=0.30, as shown in FIG. 7. In the wheel lock region in which the road drive force curve TB is lower than the CVT inertia torque curve TFCVT, the drive wheel will lock up unless the driving force from the engine increases.

Therefore, the engine and the drive wheels are held connected by the drive line, the drive wheel speed is used as part of an input to maintain the desired wheel speed level or to increase the wheel speed to the desired level, and at the same time, the shift limit (or minimum transmission ratio) of the engine brake range (such as the L range or the 2 range) is decreased from a normal limit ratio (such as the normal L range minimum ratio CLmin or the normal 2 range minimum ratio C2min) to a modified limit ratio (a low friction engine brake range minimum ratio C'EBmin (CLFLO) such as a low mu L range minimum ratio C'Lmin or a low mu 2 range minimum ratio C'2min) to reduce the braking force due to engine braking to the drive wheels and to reduce the CVT inertia torque against the road driving force so as to help the drive wheels revolve by the driving force of the road surface and the vehicle body movement.

The above-mentioned low μ engine brake range minimum ratio CLFLO needs to be set lower than the drive wheel lock region. For example, it is possible to set the low μ engine brake range minimum ratio CLFLO at a first wheel lock avoiding minimum ratio C0.30min smaller than Ca when the friction coefficient μ is about 0.30, and at a second wheel lock avoiding minimum ratio C0.10min smaller than Cb when the friction coefficient m is about 0.10. In the control system according to this embodiment of the present invention, however, the low μ engine brake range minimum ratio CLFLO is set at the D range minimum ratio CDmin in order to reduce the engine braking force to the drive wheels and the CVT inertia torque as much as possible in consideration of the safety in various situations. The magnitude of the wheel deceleration with respect to a predetermined braking force increases according as the road friction coefficient m decreases. Therefore, it is possible to calculate the wheel lock avoiding minimum ratio $C_\mu min$ (such as C0.30min and C0.10min) from the wheel deceleration, and to employ the thus-calculated ratio $C_\mu min$ as the low friction engine brake range minimum ratio CLFLO. Moreover, this low friction engine brake range minimum CLFLO is intended to give priority to the control to enable the drive wheels to be rotated by the driving force of the road, and accordingly, it does not matter practically which of the L range and the 2 range is selected.

On a road surface having a high friction coefficient, each tire maintains a sufficient gripping force, and therefore the control of reducing the shift limit of the engine brake range would possibly deteriorate the braking performance by decreasing the braking force from the engine to the driving force needlessly. The control system according to this embodiment, therefore, is arranged to perform the engine brake range shift limit reduction control only when the rate of decrease of the wheel speed with respect to time is greater than a predetermined value.

The control system according to this embodiment is further arranged to cancel the engine brake range shift limit reduction control when a transmission shift range (such as a D, P, R or N rage) other than the engine brake range is selected because the engine braking force and the transmission inertia torque are not problematical and the shift limit reduction control is not desired.

Figure 8:
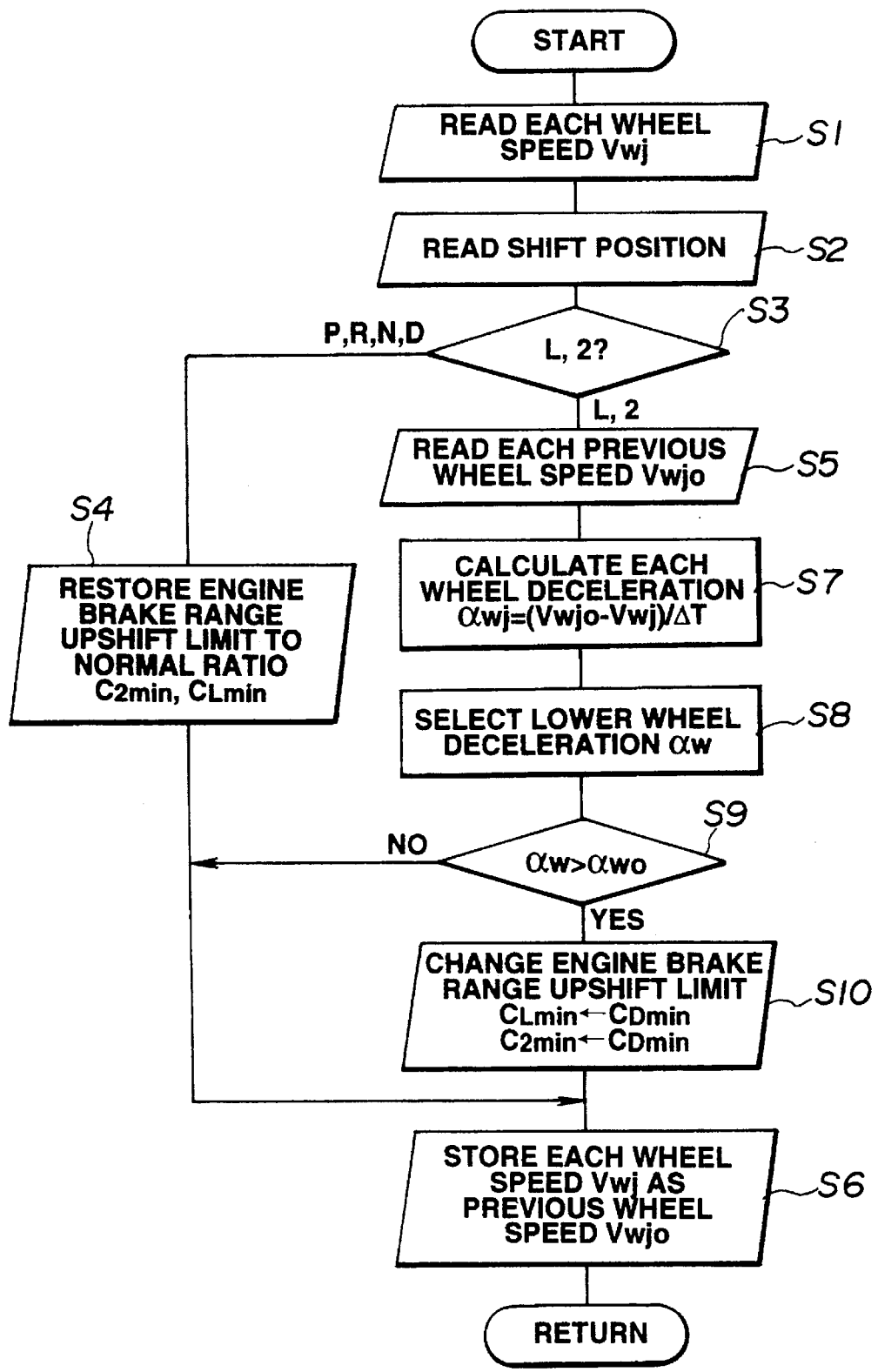
FIG. 8 is a flowchart showing a shift pattern changing procedure according to the first embodiment of the present invention.

FIG. 8 shows a shift pattern changing procedure according to the first embodiment of the present invention. The microcomputer 300 performs this procedure to change the shift pattern at regular intervals of a predetermined cycle time ($\Delta T$) by a timer interrupt. The shift pattern calculated in this procedure is stored in the RAM 315, and the microcomputer 300 performs the shift control of FIG. 5 by using the most recent shift pattern stored in the RAM 315. Therefore, the priority of the procedure of FIG. 8 is higher than that of FIG. 5.

At a step S1, the CPU 313 of the onboard microcomputer 300 reads each wheel speed Vwj sensed by the left drive wheel speed sensor 402 or the right drive wheel speed sensor 404.

At a step S2, the CPU 313 reads the shift position sensed by the shift position switch 304.

At a step S3, the CPU 313 determines whether the shift position obtained at the step S2 is in the engine brake range or not. In this example, the CPU 313 determines whether the shift position in one of L and 2 ranges or not. If the sensed shift position is in one of the P, R, N and D ranges, then the CPU 313 proceeds from the step S3 to a step S4. If the shift position is in the engine brake range, that is if the L or 2 range is selected, then the CPU 313 proceeds from the step S3 to a step S5.

At the step S4, the CPU 313 sets the shift limits of the L and 2 ranges in the control maps, equal to the normal L range minimum ratio CLmin (=Cmax) and the C2min, respectively, and stores the thus-updated shift limits of the L and 2 ranges in the RAM 315. Then, the CPU 313 proceeds from the step S4 to a step S6.

At the step S5, the CPU 313 reads a most recent value of each previous wheel speed Vwjo stored in the RAM 315.

At a step S7 following the step S5, the CPU 313 calculates each wheel deceleration $\alpha wj$ according to the following equation (1) by using the corresponding current wheel speed Vwj obtained at the step S1 and the corresponding previous wheel speed Vwjo obtained at the step S5.

$$\alpha wj = (Vwjo - Vwj)/\Delta T \qquad (1)$$

At a step S8 next to the step S7, the CPU 313 selects a smaller one of the wheel decelerations $\alpha wj$ of the left and right drive wheels determined at the step S7 by an operation of select-low, and sets a wheel deceleration $\alpha w$ equal to the selected smaller deceleration value. Then, the CPU 313 proceeds to a step S9.

At the step S9, the CPU 313 determines whether or not the wheel deceleration $\alpha w$ determined at the step S8 is greater than a predetermined wheel deceleration value $\alpha wo$. The CPU 313 directly proceeds to the step S6 if $\alpha w$ is smaller than $\alpha wo$, and to a step S10 if $\alpha w$ is greater than $\alpha wo$. It is possible to employ the wheel acceleration which is the rate of change of the wheel speed and which is positive when the wheel speed is increasing, and negative when the wheel speed is decreasing. In this case, the CPU determines at the step S9 whether the negative wheel acceleration is equal to or smaller than the predetermined negative wheel acceleration value whose absolute value is equal to $\alpha wo$. If the absolute value of the negative wheel acceleration is equal to or greater than the absolute value of the predetermined negative wheel acceleration value, then CPU 313 proceeds to the step S10.

The predetermined wheel deceleration value $\alpha wo$ is chosen as follows: The wheel deceleration exceeds this predetermined deceleration value $\alpha wo$ when the wheel receives a great braking force on a low friction coefficient road surface, and decelerates increasing the tendency to wheel lock, but the wheel deceleration does not exceed this value $\alpha wo$ on a high friction coefficient road surface even at hard braking.

At the step S10, the CPU 313 sets the upshift limits of the L and 2 ranges equal to low μ minimum ratios C'Lmin and C'2min (smaller modified limit ratios). In this example, the low μL range minimum ratio C'Lmin and the low μ 2 range minimum ratio C'2min are both equal to the minimum ratio Cmin (=the D range minimum ratio CDmin). Then, the CPU 313 stores these values in the RAM 315, and proceeds from the step S10 to the step S6.

The step S6 is reached from the step S4 or the step S10. At the step S6, the CPU 313 updates the previous wheel speeds Vwjo by storing the current wheel speeds obtained at the step S1 as the previous wheel speeds in the RAM 315. After the step S6, the CPU 313 returns to the main program.

This control system is operated as follows:

When the vehicle is moving on a road surface of a high friction coefficient such as a dry paved road surface, with the accelerator pedal being depressed and the D range being selected, holding the vehicle speed constant or increasing the vehicle speed, then the control system repeats the flow of the steps S1, S4, S6 and the ending step to return to the main program. Therefore, the control system performs the normal transmission ratio control of the FIG. 5 without changing the shift patterns.

If, from this state, the driver releases the accelerator pedal without applying the brakes, the vehicle comes into a coasting operation. In this coasting operation, a so-called back torque due to the engine braking is applied to each wheel as a braking force. However, the control system follows the sequence of the steps S1, S4 and S6 since the transmission is still in the D range.

If, on the high friction coefficient road surface, the transmission ratio is forcibly increased and the engine brake is applied to each drive wheel by a manual downshift from the D range to the L or 2 range, then the control system enters the branch of the steps S5, S7 and S8, from the step S3. On the high μ road surface, however, the wheel deceleration αw does not exceed the predetermined level αwo unless the brake pedal is depressed. Therefore, the control system proceeds from the step S9 to the step S6 bypassing the step S10, and holds unchanged the normal shift patterns of the L and 2 ranges stored in the RAM 315. Thus, the control system controls the transmission ratio at a greater level resulting in a greater overall reduction ratio of the vehicle, and helps improve the braking performance of the vehicle by allowing the engine to apply a greater engine braking back torque to the drive wheels.

When, still in the state of the high friction coefficient and the L or 2 range, the vehicle starts coasting as in a transition from an uphill operation to a downhill or level operation, the driving force from the engine reduces remarkably, and the transmission ratio is set at the minimum ratio of the L or 2 range because of a decrease of the throttle opening, so that each drive wheel receives a great braking from by the back torque of the engine brake, and the CVT inertia torque remains relatively great. In this case, however, the tendency toward wheel lock remains low on this high friction coefficient road surface, and the wheel deceleration αw remains under the predetermined level αwo. Therefore, the control system still detours the step S10, holds the engine brake range shift patter unchanged, and allows the engine brake to apply a great braking force to the drive wheels.

In this way, on the high friction coefficient road, this control system does not decrease the shift limits of the L and 2 ranges, and ensures the sufficient braking ability by making the best use of the engine braking.

On a low μ road surface such as a road surface covered with snow or ice or a wet tiled road surface, by contrast, the braking force readily increases the tendency of the wheels to lock, and the driving force applied from the low μ road surface to the wheel is not enough to regain the wheel speed. On such a slippery road surface, therefore, the wheel speed is readily decreased and the wheel deceleration is increased above the threshold value αwo by an application of the brake pedal, or a manual downshift or a transition to a coasting state in the L or 2 range. When the wheel deceleration increases in this way in the L or 2 range, the control system of this example checks the wheel deceleration at the step S9 of FIG. 8 and changes, at the step S10, the shift limit of the L and 2 ranges to the reduced, modified limit ratios, which are equal to each other, in this example, that is, C'Lmin=C'2min=CLFLO, and which, in this example, are equal to the D range minimum ratio CDmin, that is C'Lmin= C'2min=CLFO=CDmin. The control system thus changes the shift patterns of the L and 2 ranges by storing these reduced modified limit ratios C'Lmin and C'2min in the RAM 315 in place of the normal limit ratios CLmin and C2min. Once the shift patterns are changed at the step S10, the control system maintains the modified shift patterns with the modified shift limits in the control maps, as long as the shift position remains in the L or 2 range, independent of the magnitude of the wheel deceleration, that is, independent of whether the answer of the step S9 is affirmative or negative.

While the shift position is held unchanged in the L or 2 range, and the shift limits of the L and 2 ranges are held equal to the reduced modified limit ratios C'Lmin and C'2min which are equal to the D range minimum ratio CDmin, the control system controls the transmission ratio of the CVT 29 in the same manner as in the D range, in accordance with the engine and vehicle operating parameters by executing the control procedure of FIGS. 5A and 5B. Therefore, the control system can sufficiently decrease the overall reduction ratio of the vehicle by decreasing the transmission ratio of the CVT beyond the normal upshift limits of the L and 2 ranges in response to a decreases of the throttle opening. By so doing, the control system can decrease the braking force frown the engine, and the transmission's inertia torque acting against the driving effort from the road surface, and help the drive wheels maintain or recover desirable wheel speeds. In this way, the control system can improve the steering control and the braking distance.

When the driver moves the select lever from the L or 2 position for the engine brake range, to the D position or some other shift position such as the P, N or R position, then the control system reaches the step S4 from the step S3, and restores the shift patterns of the L and 2 ranges to the normal limited patterns with the normal L and 2 range minimum ratios CLmin and C2min.

Figure 9:
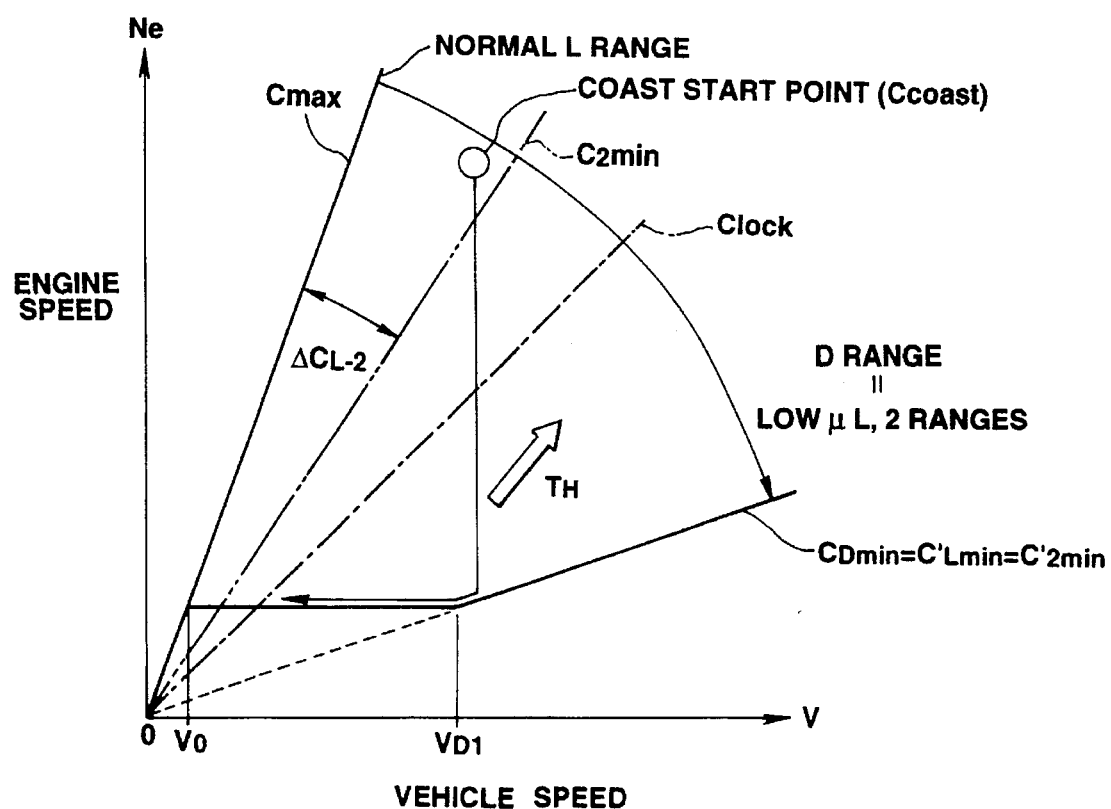
FIG. 9 is a graph for illustrating an engine brake range shift pattern changed by the procedure of FIG. 8.

If the driver selects the 2 range, and release or slacken the accelerator pedal to start a coasting operation when the transmission ratio is controlled at a ratio Ccoast which is greater than the normal 2 range minimum ratio C2min as shown in FIG. 9, then the control system decreases the transmission ratio from Ccoast in accordance with the decrease of the throttle opening degree TH, and the transmission ratio reaches the normal 2 range minimum ratio C2min soon after the start of the coasting operation. If the braking force of the engine brake remains small, and the drive wheel deceleration αw remains under the preset value αwo, then, the control system proceeds from the step S9 directly to the step S6, and hence prevents the transmission ratio from being decreased below the normal 2 range minimum ratio C2min by skipping the step S10. This normal 2 range minimum C2min is greater than a minimum transmission ratio Clock, shown in FIG. 9, for avoiding wheel lock on a slippery road surface having a tire-road surface static friction coefficient μ of a low level such as 0.30 or 0.10. This lock avoiding minimum ratio Clock is obtained by conversion from the CVT inertia torque TFCVT. If, therefore, the limitation of the upshift to this normal 2 range minimum ratio C2min were continued on the slippery road surface, the driving force from the slippery road surface would remain too weak to increase the wheel speed against the engine braking force and the CVT inertia torque, and the drive wheels would lose the speed rapidly and fall into wheel lock. The control system according to this embodiment can avoid this by monitoring the drive wheel deceleration at the step S9 and widen the transmission ratio control ranges of the L and 2 ranges to the width (ΔCL–D) of the D range. The control system, therefore, decreases the transmission ratio beyond the normal upshift limit C2min, up to the D range minimum CDmin in accordance with the throttle opening TH decreased by the coasting operation. Thus, the control system can decrease the engine braking force decreases, and the CVT inertia torque, and enables the driving force Tμ of the road surface to spin the drive wheels against the CVT inertia torque TFCVT as shown in FIG. 7. The drive wheels, therefore, regain the wheel speed, or hold the wheel speed in the optimum range to provide an adequate braking performance.

During this, the actual vehicle speed undergoes little or no change, and the control system decreases the transmission ratio along a vertical straight line of a constant vehicle speed as shown in FIG. 9, to the D range minimum ratio though the transmission ratio may be held at the normal 2 range minimum ratio for a while. The change (or the removal) of the shift limits of the engine braking ranges causes a temporary slight fluctuation of the engine speed, but this fluctuation disappears promptly.

By the thus-obtained braking effect, the vehicle speed V decreases, and the transmission ratio is held at the D range minimum ratio until the vehicle speed V reaches the D range minimum ratio vehicle speed VD1 shown in FIGS. 6 and 9. With a further decrease of the vehicle speed V, the transmission ratio is increased along a horizontal line segment of the throttle opening threshold valve TH1 shown in FIGS. 6 and 9. In this stage, the engine braking force is acting effectively, and the control system can increase the transmission ratio without deteriorating the braking performance.

Each of the embodiments according to the present invention is applicable to a vehicle equipped with an anti-skid brake control system (also called a wheel slip brake control system). In this case, the control system can perform the procedure of FIG. 8 (in the case of the first embodiment) in conjunction with the actuation signal of the anti-skid brake control system. Moreover, it is possible to employ an operation (as a step in the flowchart of FIG. 8 in the case of the first embodiment) to check the degree of wheel slip in addition to the step of checking the wheel deceleration.

Figure 1:
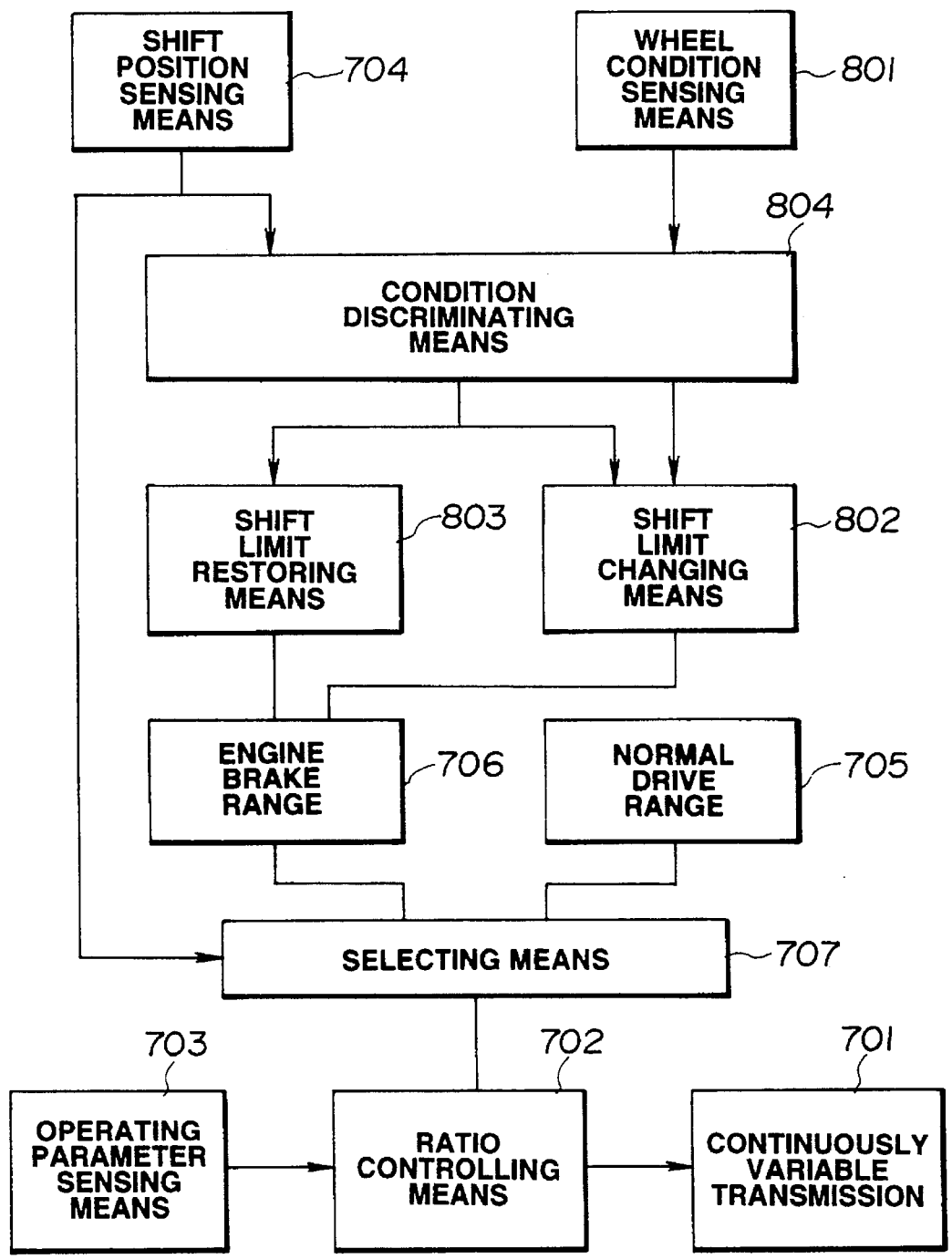
FIG. 1 is a block diagram illustrating an arrangement of various means which can be employed in the present invention.

In the first embodiment, though various other interpretations are possible, it is possible or optional to regard the steps S1, S5, S6, S7 and S8 of FIG. 8 as corresponding to a wheel deceleration sensing means 801 shown in FIG. 1; at least the step S10 as corresponding to a shift limit (or pattern) changing means 802 shown in FIG. 1; at least the step S4 as corresponding to a shift limit (or pattern) restoring means 803, and the control procedure of FIG. 5 as corresponding to a ratio controlling means 702 shown in FIG. 1.

Figure 10:
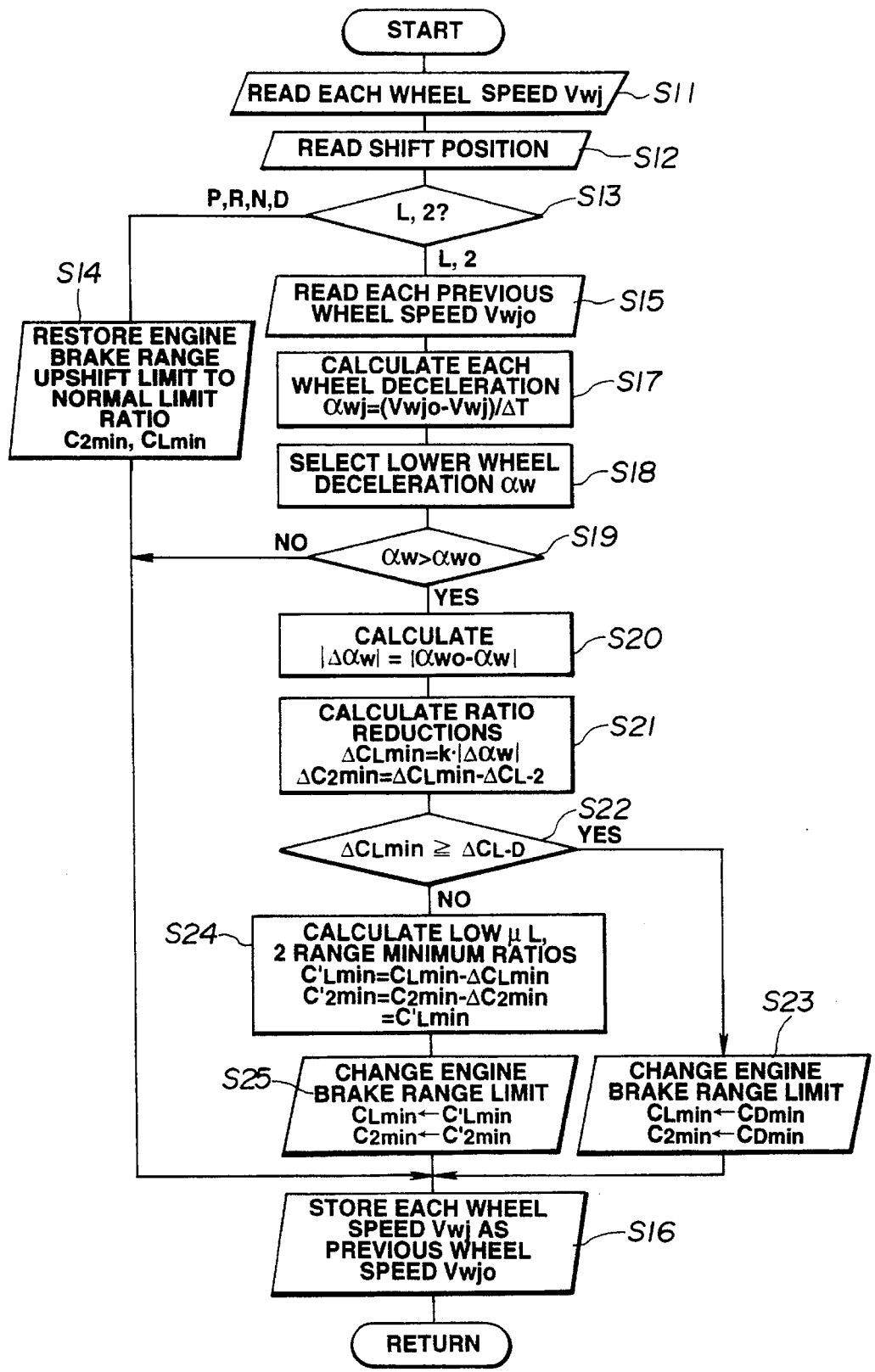
FIG. 10 is a flowchart showing a shift pattern changing procedure according to the second embodiment of the present invention.
Figure 11:
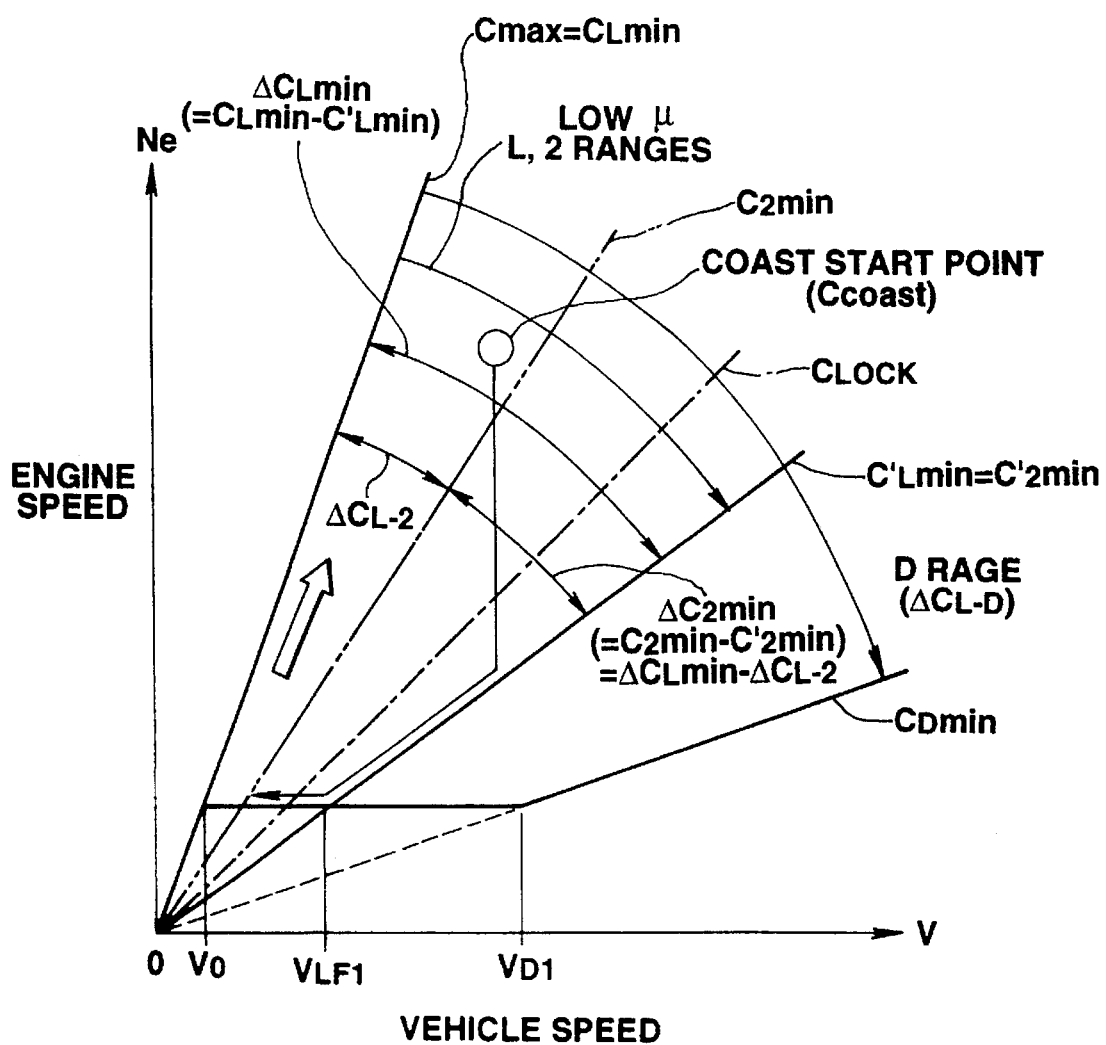
FIG. 11 is a graph showing an engine brake range shift pattern changed by the procedure of FIG. 10.

A second embodiment is shown in FIGS. 10 and 11. A CVT shift control system according to the second embodiment is almost the same as the CVT system shown in FIGS. 2–9. In particular, the drive system, the hydraulic system, the control unit and the basic shift control procedure, and the basic shift patterns according to the second embodiment are substantially identical to those according to the first embodiment shown in FIG. 2, FIGS. 3A and 3B, FIG. 4, FIGS. 5A and 5B, and FIGS. 6 and 7. FIGS. 1–7 are common to the first and second embodiments, and the subsequent embodiments of the present invention.

The control system according to the second embodiment is designed to decrease the upshift limit of at least one engine brake range by an amount (ΔCLmin, ΔC2min) determined in accordance with the sensed wheel decelerating condition when the wheel deceleration αw is greater than the predetermined level αwo, from the following reason.

When, for example, the wheels receive a great braking force during a relatively high vehicle speed operation on a low μ road surface, then the wheel speed is decreased at a high rate from a level keeping pace with the vehicle speed, and deviates greatly from a desired wheel speed level to hold the degree of wheel slip (which is calculated from the wheel speed and the vehicle speed) within the desirable range. In order to rapidly reduce this great deviation of the actual wheel speed from the desired level, and thereby to ensure the braking performance, it is desirable to increase the reduction quantities by which the engine braking force and the CVT inertia torque are reduced, in accordance with this deviation. Accordingly, it is possible and useful in some sense to increase the reduction quantity (ΔCLmin, ΔC2min) of the upshift limit of the engine brake range in accordance with the deviation of the sensed actual wheel speed from the desired wheel speed. However, this deviation is a result of deceleration by the engine braking force and the CVT inertia torque, and corresponds to an integral of the drive wheel deceleration, so that this deviation brings in a delay, when used as an input to the control system. In the second embodiment, therefore, the reduction quantity (ΔCLmin, ΔC2min) of the engine brake range shift limit is determined in accordance with the wheel deceleration.

FIG. 10 shows a shift pattern changing procedure according to the second embodiment which the microcomputer 300 performs to change the shift pattern at regular intervals of a predetermined cycle time (ΔT) by a timer interrupt routine.

At a step S11, the CPU 313 of the control system according to the second embodiment reads the left and right drive wheel speeds VwL and VwR sensed by the left drive wheel speed sensor 402 and the right drive wheel speed sensor 404.

At a step S12, the CPU 313 reads the shift position sensed by the shift position switch 304.

At a step S13, the CPU 313 checks the shift position obtained at the step S12 and determines whether the engine brake range (which is the 2 range or the L range in this example) is selected or not. If the selected range is one of the P, R, N and D ranges, then the CPU 313 proceeds from the step S13 to a step S14. If the shift position is in the position to select the engine brake range, that is if the L or 2 range is selected, then the CPU 313 proceeds from the step S13 to a step S15.

At the step S14, the CPU 313 sets the upshift limits of the L and 2 ranges in the control maps corresponding to FIG. 6, equal to the normal L range minimum ratio CLmin (=Cmax) and the C2min, respectively, and stores the thus-updated shift limits of the L and 2 ranges in the RAM 315. Then, the CPU 313 proceeds from the step S14 to a step S16.

At the step S15, the CPU 313 reads the most recent values of the previous left and right drive wheel speeds Vwjo stored in the RAM 315.

At the step S17, the CPU 313 calculates the left and right wheel decelerations αwL and αwR according to the following equations (1a) and (1b) by using the current left and right drive wheel speeds VwL and VwR obtained at the step S11 and the previous left and right wheel speed VwLo and VwRo obtained at the step S15.

$$\alpha wL = (VwLo - VwL)/\Delta T \tag{1a}$$

$$\alpha wR = (VwRo - VwR)/\Delta T \tag{1b}$$

At a step S18, the CPU 313 determines the (representative) wheel deceleration αw which, in this example, is set equal to a smaller of the left and right drive wheel decelerations αwL and αwR. Then, the CPU 313 proceeds to a step S19.

At the step S19, the CPU 313 determines whether or not the wheel deceleration αw determined at the step S18 is greater than the predetermined wheel deceleration αwo. The CPU 313 proceeds to a step S16 corresponding to the step S6 of FIG. 8 if αw<αwo, and to a step S20 if αw>αwo. When αw=αwo, the program of this example proceeds to the step S16, but the program may be arranged to proceed to the step S20 instead. Normally, the wheel deceleration does not exceed this value αwo on a high friction road surface even by a hard brake pedal operation, but this wheel deceleration value αwo is exceeded when the a great braking force is applied on a low friction road surface and the tendency to wheel lock increases.

The steps S11~S19 of FIG. 10 are substantially identical to the steps S1~S9 of FIG. 8.

At the step S20, the CPU 313 calculates an absolute value of wheel deceleration deviation |Δαw| by using the wheel deceleration αw obtained at the step S18, and the above-mentioned predetermined wheel deceleration value αwo. That is;

$$|\Delta\alpha w|=|\alpha wo-\alpha w| \qquad (2)$$

After the step S20, the CPU 313 proceeds to a step S21.

At the step S21, the CPU 313 calculates an L range limit ratio reduction ΔCLmin and a 2 range limit ratio reduction ΔC2min according to the following equations (3) and (4) by using the deceleration deviation |Δαw| obtained at the step S20.

$$\Delta CLmin=k|\Delta\alpha w| \qquad (3)$$

$$\Delta C2min=\Delta CLmin-\Delta CL-2=k|\Delta\alpha w|-\Delta CL-2 \qquad (4)$$

In these equations, k is a predetermined proportionality constant. After the step S21, the CPU 313 proceeds to a step S22.

At the step S22, the CPU 313 determines whether the L range ratio reduction ΔCLmin calculated at the step S21 is equal to or greater than the greatest ratio difference ΔCL–D shown in FIG. 6. If the L range ratio reduction A CLmin is equal to or greater than the greatest ratio difference ΔCL–D which is a difference resulting from subtraction of the overall minimum ratio Cmin (=CDmin) from the overall maximum ratio Cmax (CLmin), then the CPU proceeds from the S22 to a step 23. If ΔCLmin<ΔCL–D, then the CPU 313 proceeds to a step S24.

At the step S23, the CPU 313 sets each of the upshift limits of the L and 2 ranges equal to the D range minimum ratio CDmin (=Cmin), and stores the thus-updated limit ratios of the L and 2 ranges in the RAM 315. After the step S23, the CPU 313 proceeds to the step S16.

At the step S24 on the other hand, the CPU 313 calculates the modified (low μ) limit ratios C'Lmin and C'2min of the L and 2 ranges according to the following equations by using the ratio reduction quantities ΔC2min and ΔCLmin determined at the step S21.

$$C'Lmin=CLmin-\Delta CLmin \qquad (5a)$$

$$C'2min=C2min-\Delta C2min \qquad (5a)$$

In this example, the modified (low μ) limit ratios C'Lmin and C'2min of the L and 2 ranges are equal to each other. That is, C'Lmin=C'2min=CLFLO. From the step S24, the CPU 313 proceeds to a step S25.

At the step S25, the CPU 313 sets the upshift limits of the L and 2 ranges equal to the modified limit ratios determined at the step S24, and stores the thus-updated upshift limits in the RAM 315. Then, the CPU 313 proceeds to the step S16.

At the step S16, the CPU 313 updates the previous wheel speeds by storing the current wheel speeds obtained at the step S11 as the previous wheel speeds in the RAM 315. After the step S16, control is transferred to the main program.

On a high friction coefficient road, this control system does not decrease the shift limits of the L and 2 ranges, and ensures the sufficient braking ability by making the best use of the engine braking as the control system according to the first embodiment.

When the wheel deceleration increases on a low friction road surface in the L or 2 range, the control system of this example checks the wheel deceleration at the step S19 of FIG. 10. If the wheel deceleration is greater than the predetermined level αwo, the control system decreases the shift limits of the L and 2 ranges by the amounts equal to ΔCLmin and ΔC2min calculated at the step S21. In this way, the shift limit of at least one engine brake range is changed to the modified limit ratio, and the amount of change is varied in accordance with the sensed drive wheel deceleration. In this example, the amount of change (ΔCLmin and ΔC2min) increases smoothly and monotonically as the wheel deceleration increases, and specifically, the amount of change (ΔCLmin and ΔC2min) of this example is proportional to the deviation of the sensed wheel speed αw from the predetermined value αwo. The modified limit ratios are prevented from exceeding the CDmin at the steps S22 and S23. Once the shift patterns are changed at the step S23 or S25, the control system does not return the shift patterns to the normal forms, as long as the shift position is the L or 2 position, independent of the magnitude of the wheel deceleration, that is, independent of whether the answer of the step S19 is affirmative or negative.

In the second embodiment, the shift limit of the engine brake range is decreased in accordance with the wheel deceleration. Therefore, the engine braking force of an adequate magnitude effectively acts on the drive wheels against the driving force of the road surface. The modified limit ratio of the engine brake range is determined, between the D range minimum and the normal limit ratio, in dependence on the wheel deceleration, namely in dependence on the deviation of the driving force from the road from the engine braking force to the drive wheels and the transmission inertia torque at the normal limit ratio. In this way, the control system according to the second embodiment can provide an optimum braking performance according to the friction coefficient of the road surface.

If, for example, the driver selects the 2 range, and release the accelerator pedal to start a coasting operation when the transmission ratio is controlled at a ratio Ccoast which is greater than the normal 2 range minimum ratio C2min as shown in FIG. 11, then the control system decreases the transmission ratio from Ccoast in accordance with the decrease of the throttle opening degree TH, and the transmission ratio reaches the normal 2 range minimum ratio C2min soon after the start of the coasting operation. If, in this case, the friction coefficient of the road is low, the drive wheel speed decreases sharply and the rate of decrease exceeds the threshold level αwo. Responding to this sharp decrease of the drive wheel speed, the control system widen the range of the ratio control of the 2 range to the reduced modified 2 range minimum ratio C'2min shown in FIG. 11, and allows the transmission ratio to further decrease beyond the normal limit ratio C2min. In this case, the modified limit ratio C'2min is determined in dependence on the wheel deceleration which is equivalent to the deviation of the engine braking force and the CVT inertia torque from the driving force from the road surface. Therefore, the modified limit ratio C'2min is set at a value slightly smaller than the lock avoiding ratio Clock as shown in FIG. 11. For the modified ratio C'2min is greater than then the D range minimum CDmin, the braking force of the engine braking is applied to the drive wheels to improve the braking distance.

During this, the actual vehicle speed hardly changes, and the control system decreases the transmission ratio along a vertical straight line of a constant vehicle speed as shown in FIG. 11, to the modified limit ratio C'2min.

Then, the transmission ratio is held at the modified limit ratio C'2min until the vehicle speed V decreases and reaches the low mu engine brake range minimum ratio vehicle speed VLF1 shown in FIG. 11. With a further decrease of the vehicle speed V, the transmission ratio is increased along a horizontal line of the throttle opening threshold valve TH1 shown in FIG. 11. In this stage, the engine braking force is acting effectively, and the control system can increase the transmission ratio without deteriorating the braking performance.

The control system according to the second embodiment can make use of an appropriate engine braking force to improve the braking performance of the vehicle by determining the amount of change of the shift limit of the engine braking range in accordance with the wheel deceleration. In the second embodiment, it is possible to regard at least the steps S22~S25 as corresponding to the shift limit (or pattern) changing means 802 shown in FIG. 1.

Figure 12:
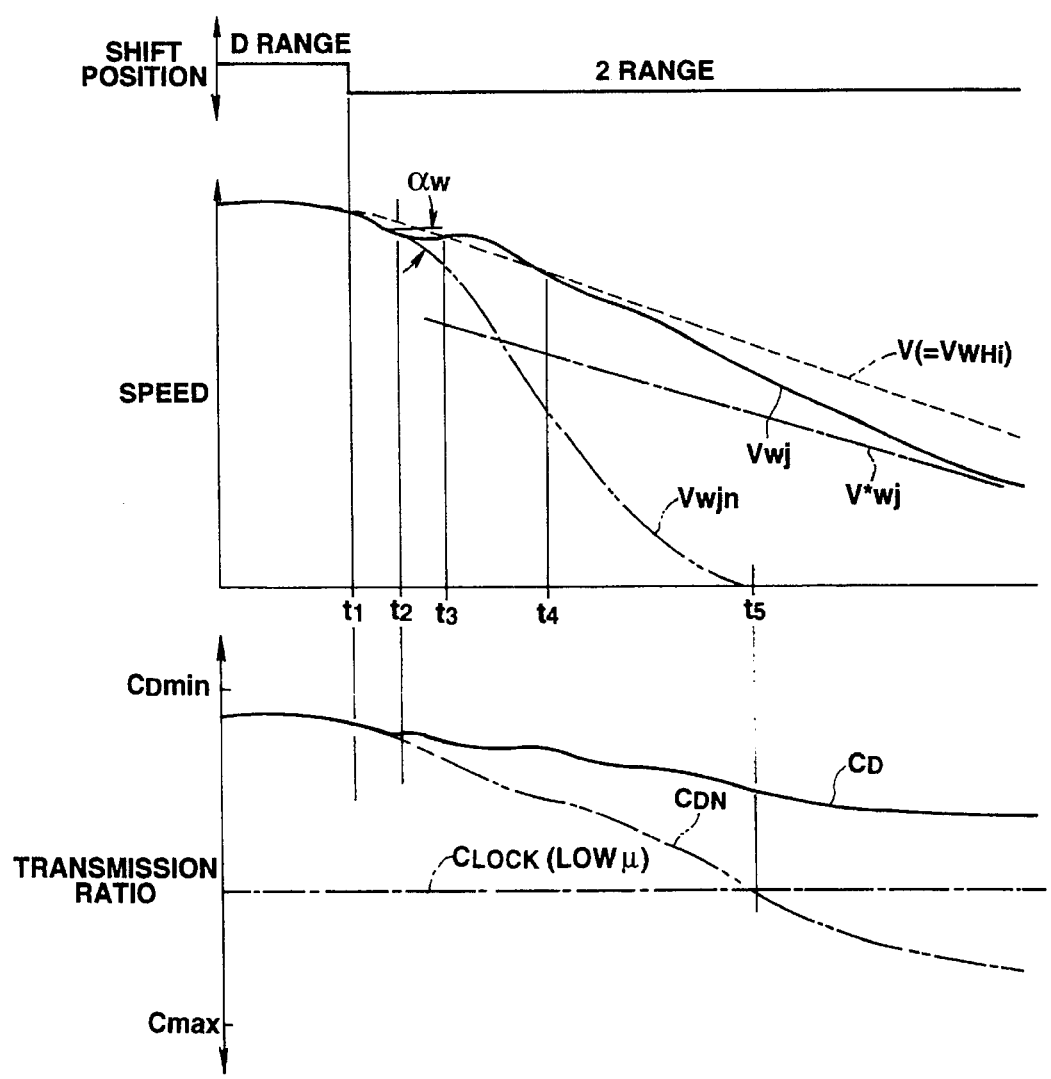
FIG. 12 is a time chart showing variations with time of the wheel speed and the transmission ratio of the CVT according to the present invention.

FIG. 12 illustrate the manner the control system according to each of the embodiments of the present invention increases the wheel speed. FIG. 12 is the results of a simulation experiment to confirm how the drive wheel speed Vwj, and the transmission ratio CD of the CVT vary with time when the shift position is changed from the D position to the 2 position at an instant t1 during driving on a low friction road surface. To facilitate the understanding, the example of FIG. 12 employs, as the vehicle speed V, a quasi vehicle speed used in the anti skid brake system, that is, a maximum wheel speed VwHi. A desired wheel speed V*wj is set equal to a product obtained by multiplying the vehicle speed V (=VwHi) by a predetermined coefficient (which is equal to 0.7, in this example) to attain the upper limit value, about 30%, of the desired range of the wheel slip degree with respect to the vehicle speed V. In the example of FIG. 12, the accelerator pedal is not depressed, and the throttle opening TH is very small. In FIG. 12 two dot chain lines show the characteristics of the transmission ratio CDN and the wheel speed Vwjn when the shift control is performed with the normal shift pattern without the shift limit changing control of the present invention. FIG. 12 further shows the lock minimum ratio CLOCK of this low friction coefficient road surface, obtained by conversion from the above-mentioned CVT inertia torque TFCVT.

Soon after the manual shift to the 2 range at the instant t1, the desired transmission ratio is set equal to the normal 2 range minimum ratio C2min, and accordingly, the actual transmission ratio CD of the CVT is gradually increased. As a result, the wheel speed Vwj decreases rapidly, and the wheel deceleration αw represented by the slope of the wheel speed characteristic curve exceeds the predetermined level αwo at an instant t2. Therefore, the control system according to the present invention decreases the upshift limit of the 2 range from the normal limit ratio C2min to the modified limit ratio C'2min, and allows the desired transmission ratio to further decrease accordingly. Therefore, the actual transmission ratio CD is decreased at a relatively high rate as shown in FIG. 12. As a result, the engine revolution at the idle speed (rpm) causes the drive wheel speed Vwj to increase rapidly on the low mu road surface, and the wheel speed Vwj is higher than the vehicle speed V for a time from an instant 13 to an instant 14, during which a so called slip loss appears. After the instant 14, however, the driving force of the road surface and the braking force of the engine act effectively on the drive wheels, and the vehicle speed V decreases smoothly. During this, the drive wheel speed Vwj does not decrease below the desired wheel speed lower limit V*wj for satisfying the requirement of the desired wheel slip degree, so that the steering control and the braking ability of the vehicle are maintained. This is because the desired transmission ratio is held at the relatively small low mu 2 range minimum ratio C'2min, and consequently the actual transmission ratio CD is smoothly increased in accordance with the decrease of the vehicle speed V. During this, the actual transmission ratio CD does not increase over the lock minimum ratio CLOCK, and therefore, the wheels are prevented from wheel lock unless an intentional braking force is added.

In the case of the conventional system without the shift limit changing control according to the present invention, the wheel speed Vwjn continues to decrease after 12, and accordingly the transmission ratio CDN is further increased. At an instant t5 at which the transmission ratio exceeds the lock minimum ratio CLOCK, the drive wheel speed Vwjn is reduced to zero, and the wheel locks up completely.

Figure 13:
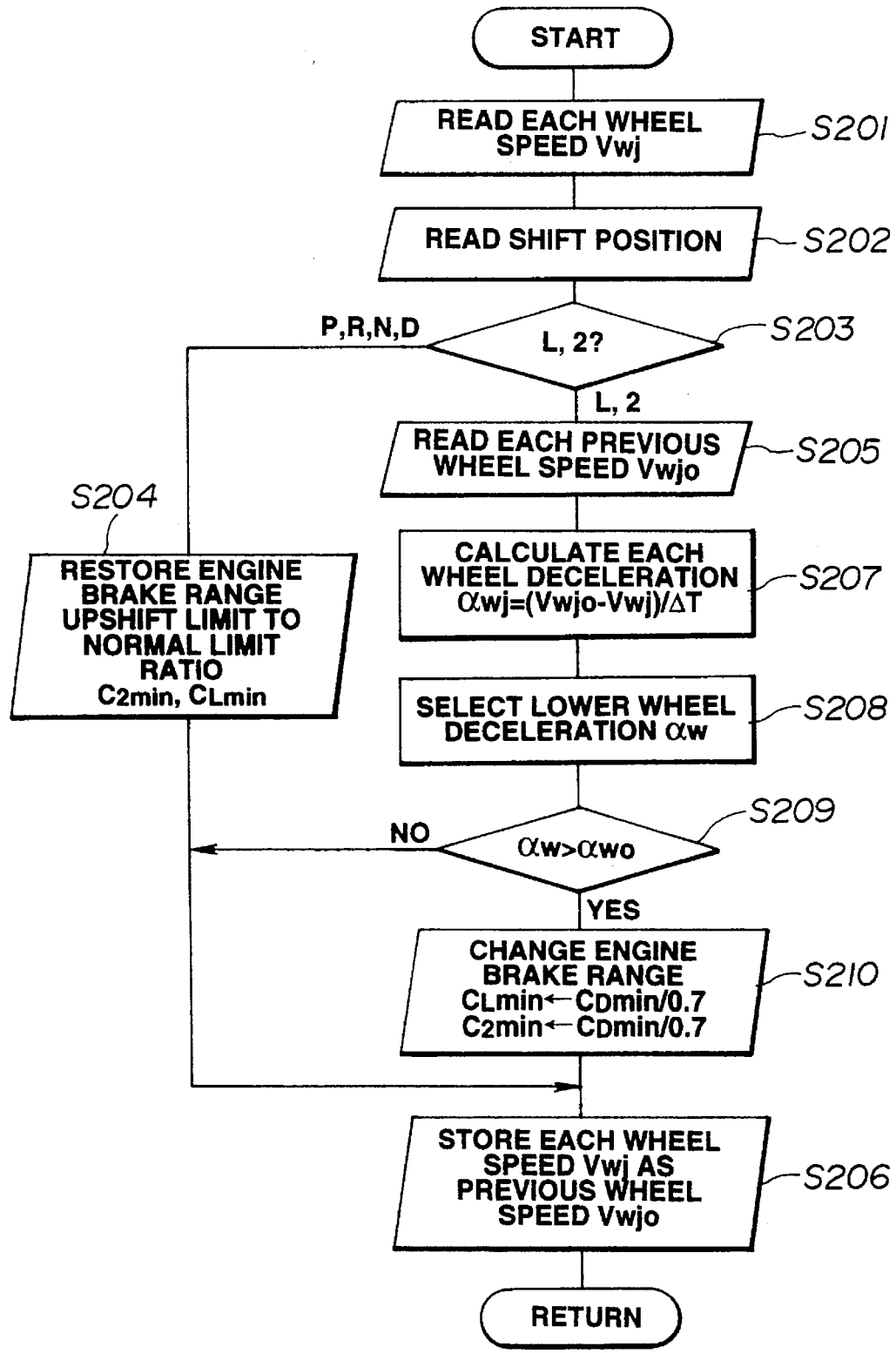
FIG. 13 is a flowchart showing a shift pattern changing procedure according to the third embodiment of the present invention.
Figure 14:
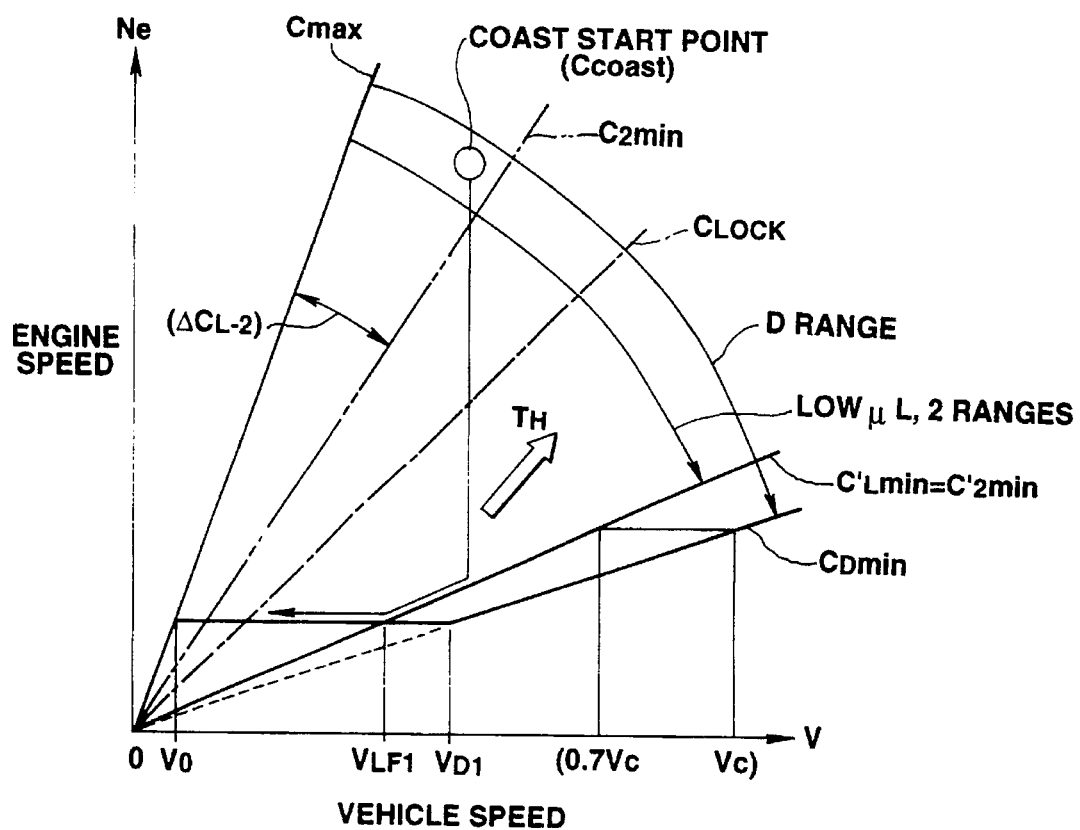
FIG. 14 is a graph for illustrating an engine brake range shift pattern changed by the procedure of FIG. 13.

A third embodiment is shown in FIGS. 13 and 14. A CVT shift control system according to the third embodiment is almost the same as the CVT system shown in FIGS. 2–9. In particular, the drive system, the hydraulic system, the control unit, the basic shift control procedure, and the basic shift patterns according to the third embodiment are substantially identical to those according to the first embodiment shown in FIG. 2, FIGS. 3A and 3B, FIG. 4, FIGS. 5A and 5B, and FIGS. 6 and 7.

In the third embodiment, the modified limit ratio (C'Lmin, C'2min) of at least one engine brake range is set equal to such a value as to make the drive wheel sped Vw equal to 70% of the vehicle body speed Vc, for example, and thereby to make the degree of drive wheel slip equal to 30%, for example, in order to secure the steering control and the braking effect. In the third embodiment, the D range minimum ratio CDmin is regarded as a ratio enabling the drive wheel speed to return to the vehicle body speed, and the modified engine brake range limit ratio (C'Lmin, C'2min) is set equal to a quotient obtained by dividing the D range minimum ratio CDmin by a predetermined constant (f) which is smaller than one and greater than zero. Preferably, the constant f is equal to or greater than 0.7, and equal to or smaller than 0.9. In the example shown in FIG. 13, this constant is 0.7 and the modified engine brake range minimum ratio C'EBmin is given by;

$$C'EBmin = CDmin/f \tag{6}$$

f=0.7

In the map shown in FIG. 14, the wheel speed Vw can be measured in terms of the vehicle body speed Vc along the horizontal axis of FIG. 14. Thus, FIG. 14 shows that the modified engine brake range minimum ratio C'EBmin (such as C'Lmin and C'2min) given by the equation (6) satisfies Vw=0.7Vc. It is possible to first consider the horizontal axis of the map as the wheel speed Vw, then to convert the wheel speed to the vehicle body speed Vc in order to determine, from the D range minimum ratio CDmin, a line of modified engine brake range minimum ratio C'EBmin corresponding to the equation Vw=0.7Vc, and to convert to the wheel speed again when the map is used.

In the third embodiment, it is possible to determine the modified engine brake range minimum ratio in some other manners. For example, the following equation (6') can be employed instead of the equation (6). According to the equation (6'), the control system calculates the modified engine brake range minimum ratio C'EBmin from the sensed vehicle speed V (=Vc) from the engine speed sensor 302, and the sensed engine speed Neo from the engine speed sensor 301 obtained when Vw=Vc and stored in a shift register or other memory location.

$$C'EBmin = Neo/(f \cdot V) \tag{6'}$$

$f=0.7$

FIG. 13 shows a shift pattern changing procedure according to the third embodiment which the microcomputer 300 performs to change the shift pattern at regular intervals of the predetermined cycle time ($\Delta T$).

The shift pattern changing procedure shown in FIG. 13 is different from the procedure of FIG. 8 only in a step S210. Other steps S201~S209 are substantially identical to the steps S1~S9 of FIG. 8.

The step S210 is reached only when the L or 2 range is selected and the wheel deceleration is greater than the predetermined deceleration value (that is when the answers of the steps S203 and S209 are both affirmative) as in the preceding examples. At the step S210, the CPU 313 sets the upshift limits of the 2 and L ranges equal to the low μ minimum ratios C'2min and C'Lmin (modified limit ratios). In the third embodiment, the low μ 2 range minimum ratio C'2min and the low μL range minimum ratio C'Lmin are given by the following equations (6a) and (6b).

$$C'Lmin = CDmin/f \tag{6a}$$

$$C'2min = CDmin/f \tag{6b}$$

In this example, the constant f is set equal to 0.7. That is, f=0.7. The CPU 313 stores these values in the RAM 315, and then proceeds from the step S210 to the step S206.

The shift limit changing procedure shown in FIG. 13 changes the shift limits of the L and 2 ranges to the modified limit ratios which make it possible for the drive wheel speed to approach the vehicle speed V multiplied by 0.7, and thereby increase each drive wheel speed to, or maintain each drive wheel speed in, the level to hold the drive wheel slip equal to 30% for optimum steering control and braking performance.

Figure 15:
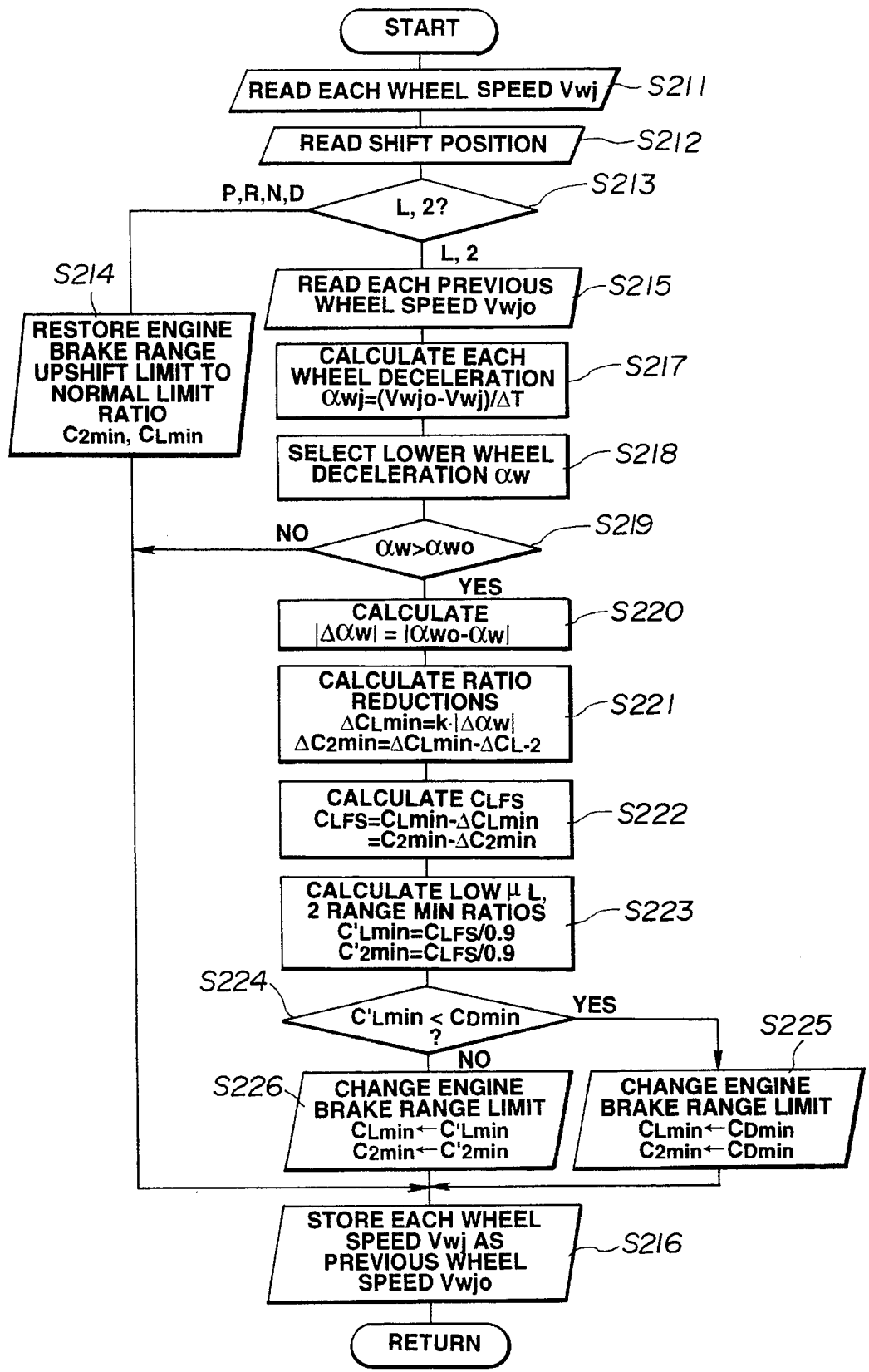
FIG. 15 is a flowchart showing a shift pattern changing procedure according to the fourth embodiment of the present invention.
Figure 16:
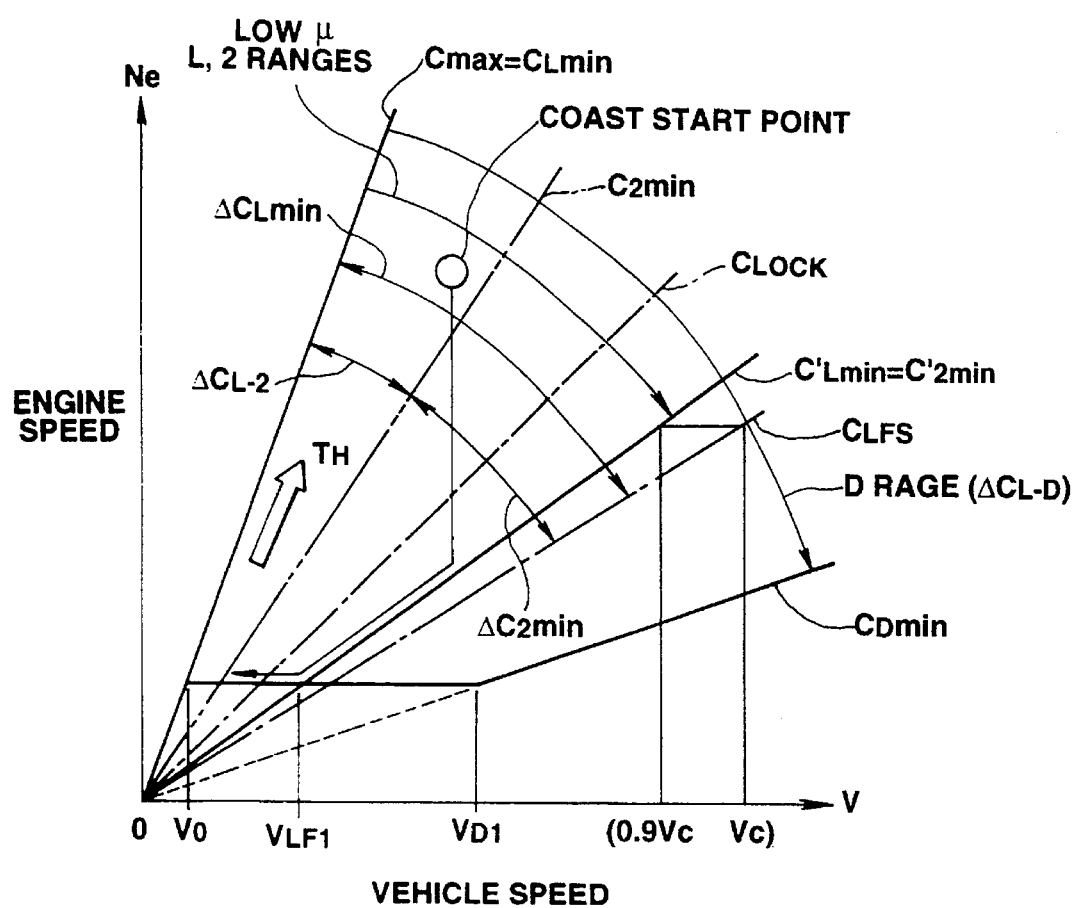
FIG. 16 is a graph for illustrating an engine brake range shift pattern changed by the procedure of FIG. 15.

A fourth embodiment is shown in FIGS. 15 and 16. A CVT shift control system according to the fourth embodiment is almost the same as the CVT system shown in FIGS. 2–9. In particular, the drive system, the hydraulic system, the control unit, the basic shift control procedure, and the basic shift patterns according to the fourth embodiment are substantially identical to those according to the first embodiment shown in FIG. 2, FIGS. 3A and 3B, FIG. 4, FIGS. 5A and 5B, and FIGS. 6 and 7.

The control system according to the fourth embodiment is arranged to estimate the friction coefficient μ of the road surface by monitoring the drive wheel deceleration and the transmission ratio; then to calculate a reference transmission ratio C"EBmin (or CLFS) to return the drive wheel speed to the vehicle speed; and finally to calculate the modified engine brake range minimum ratio C'EBmin to make the drive wheel speed equal to the vehicle speed multiplied by 0.7~0.9 to provide an optimum drive wheel slip.

In the fourth embodiment, the engine brake range reference transmission ratio C"EBmin (or CLFS) is calculated in the same manner as the modified L and 2 range limit ratios C'Lmin and C'2min according to the second embodiment shown in FIG. 10, by using an engine brake range ratio reduction quantity $\Delta$CEBmin, such as the L range ratio reduction quantity $\Delta$CLmin and the 2 range ratio reduction quantity $\Delta$C2min (which are corresponding to the reductions of the engine braking force applied to the drive wheels and the CVT inertia torque). That is;

$$C"EBmin = CEBmin - \Delta CEBmin \tag{7}$$

In the fourth embodiment, it is possible to increase the reduction quantity ($\Delta$CLmin, $\Delta$C2min, $\Delta$CEBmin) of the upshift limit of the engine brake range in accordance with the deviation of the sensed actual wheel speed from the desired wheel speed (which, in this case, is equal to the vehicle body speed). However, in the fourth embodiment, the reduction quantity ($\Delta$CLmin, $\Delta$C2min, $\Delta$CEBmin) of the engine brake range shift limit is determined in accordance with the wheel deceleration as in the second embodiment.

From the reference ratio C"EBmin (=CLFS) given by the equation (7), the control system according to the fourth embodiment determines the modified engine brake range minimum ratio C'EBmin according to the following equation (8) in order to make the drive wheel speed equal to the vehicle speed multiplied by 0.9, for example.

$$C'EBmin = C"EBmin/g \tag{8}$$

In this equation, g is a constant which is greater than zero and smaller than one. Preferably, the constant g is in the range of 0.7~0.9, like the constant f. In the example shown in FIG. 15, g=0.9. FIG. 16 shows that the modified engine brake range minimum ratio C'EBmin (such as C'Lmin and C'2min) given by the equation (8) satisfies Vw=0.9Vc.

It is possible to determine the ratio reduction ($\Delta$CLmin, $\Delta$C2min, $\Delta$CEBmin) required to achieve Vw=0.9Vc, by changing the proportionality constant k to a predetermined value. In this case, the modified limit ratio C'EBmin is set equal to the difference obtained by subtracting this reduction ($\Delta$CEBmin) from the normal limit ratio CEBmin (such as CLmin and C2min).

FIG. 15 shows a shift pattern changing procedure according to the fourth embodiment which the microcomputer 300 performs to change the shift pattern at regular intervals of a predetermined cycle time ($\Delta T$).

The shift pattern changing procedure shown in FIG. 15 is different from the procedure of FIG. 10 only in a program section of steps S222~S226. Other steps S211~S221 are substantially identical to the steps S11~S21 of FIG. 10.

When the L or 2 range is selected and the wheel deceleration is greater than the predetermined deceleration value (that is when the answers of the steps S3 and S9 are both affirmative), the CPU 313 performs the steps S220 and S221 corresponding to the steps S20 and S21, and then proceeds to the step S222.

At the step S222, the CPU 313 calculates reference (low μ limit ratios C"Lmin and C"2min of the L and 2 ranges according to the following equations by using the ratio reduction quantities $\Delta$CLmin and $\Delta$C2min determined at the step S221.

$$C"Lmin = CLmin - \Delta CLmin \tag{7a}$$

$$C''2min = C2min - \Delta C2min = C''Lmin \quad (7a)$$

In this example, the reference (low μ) limit ratios C"Lmin and C"2min of the L and 2 ranges are equal to each other. That is, C"Lmin=C"2min=CLFS, where CLFS is the common reference engine brake range limit ratio. From the step S222, the CPU 313 proceeds to the step S223.

At the step S223, the CPU 313 calculates the modified (low m) limit ratios C'Lmin and C'2min according to the following equations (8a) and (8b) by using the reference ratios determined at the step S222 (C"Lmin=C"2min= CLFS).

$$C'Lmin = C''Lmin/g \quad (8a)$$

$$C'2min = C''2min/g \quad (8a)$$

In this example, g=0.9. In this example, the modified limit ratios of the L and 2 ranges are equal to each other, and set equal to the common modified engine brake range limit ratio C'EBmin. That is, C'Lmin=C'2min=C'EBmin. After the step S223, the CPU 313 proceeds to the step S224.

At the step S224, the CPU 313 determines whether the common modified limit ratio C'EBmin (=C'Lmin=C'2min) is smaller than the drive range minimum ratio CDmin or not. If C'EBmi<CDmin, then the CPU 313 proceeds from the step S224 to the step S225. If C'EBmin>CDmin, then the CPU 313 proceeds from the step S224 to the step S226.

At the step S225, the CPU 313 sets each of the upshift limits of the 2 and L ranges equal to the D range minimum ratio CDmin, and stores the thus-updated values in the RAM 315. After the step S225, the CPU proceeds to the step S216.

At the step 226, the CPU 313 sets each of the upshift limits of the 2 and L ranges equal to the common modified engine brake range limit ratio C'EBmin determined at the step S223, and stores the thus-updated values in the RAM 315. After the step S226, the CPU proceeds to the step S216.

In this way, the control system according to the present invention can rapidly increase the drive wheel speed which has been decreased sharply on the low mu road surface, to the desired wheel speed level (the vehicle body speed multiplied by a coefficient in the range of 0.7~0.9), and hold the degree of drive wheel slip in the desired range of 10~30% to ensure the gripping force of each tire for optimum braking and steering control.

FIG. 1 shows, as one example, an arrangement of various means employed in the illustrated examples according to the first, second, third and fourth embodiments of the present invention. However, not all these means are always necessary in the present invention. The control system of the example shown in FIG. 1 comprises a continuously variable transmission (such as a belt-type or toroidal type CVT) 701; an operating parameter sensing means 703 for sensing at least one of engine and/or vehicle operating parameters such as a throttle opening degree, a vehicle speed or an engine speed; a transmission ratio controlling means 702 for controlling a transmission ratio of the CVT 701 in accordance with the operating parameter or parameters by using one of shift patterns selected by a selecting means 707 from memory sections 705 and 706. The memory sections 705 and 706 store at least one shift pattern of a normal drive range such as a D range, and at least one shift pattern of at least one engine brake range such as an L range or a 2 range, and the selecting means selects one of the shift patterns in accordance with a shift position signal supplied from a shift position sensing means 704 for sensing a shift position of the continuously variable transmission 701. For example, the shift position sensing means 704 senses a position of a movable member such as the spool 136 of the manual valve 104 shown in FIG. 3A, or a driver's manual select lever near a driver's seat. In the illustrated examples, the sequence of shift positions is; P, R, N, D, 2, L.

The control system of the example shown in FIG. 1 further comprises a wheel condition sensing means 801 for sensing a condition of at least one wheel and for supplying data to determine a wheel deceleration; a condition discriminating means 804 for determining whether the wheel deceleration determined from the wheel condition sensed by the wheel condition sensing means 801 is greater than a predetermined wheel deceleration level; and a shift limit (or pattern) changing means 802 for decreasing a shift limit of the engine brake range when the wheel deceleration is greater than the predetermined level. The condition discriminating means 804 may be arranged to further monitor the shift position signal supplied from the shift position sensing means 704 to determine whether the engine brake range is selected or not. The control system of the example shown in FIG. 1 further comprises a shift limit restoring means 803 for increasing the shift limit of the engine brake range to the normal value when the shift position is moved away from the shift position for selecting the engine brake range. With the restoring means 803, the driver can obtain a vehicle motion as the driver intends.

For example, the shift limit changing means 802 can be regarded as corresponding to the steps S10, S21~S25, S210 and S220~S226; the shift limit restoring means 803 can be regarded as corresponding to the steps S4, S14, S204 and S214; and the condition discriminating means 804 can be regarded as corresponding to the steps S9, S19, S209 and S219. The condition discriminating means 804 may be further considered as corresponding to the steps S3, S13, S203 and S213.

The present invention is not limited to the belt type CVT shown in FIG. 2, but this invention is applicable to various other types of continuously variable transmissions, and specifically to various other belt type continuously variable transmissions.

The controller for controlling the transmission ratio and changing the shift pattern according to the present invention may be in the form of a combination of electronic circuits, instead of the example employing an onboard microcomputer as shown in FIG. 4.

The present invention is applicable to a front wheel drive (FWD) vehicle, a rear wheel drive (RWD) vehicle and a four wheel drive (4WD) vehicle in analogous manners. In the case of the four wheel drive vehicle, it is possible to employ, as the vehicle speed, the quasi vehicle body speed used in the ABS control.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A shift control system, comprising:

continuously variable transmission; and shift controller which controls a transmission ratio of said continuously variable transmission between a maximum ratio and a minimum ratio when a normal drive range is selected, and which, when an engine brake range is selected, prevents the transmission ratio from decreasing beyond a shift limit of the engine brake range which is greater than said minimum ratio;

wherein said shift control system further comprises a wheel condition sensing means for sensing a revolving condition of a wheel of a vehicle to determine a wheel deceleration, and said shift controller decreases said shift limit of said engine brake range when the wheel deceleration is equal to or greater than a predetermined deceleration value;

wherein said shift controller comprises a limit changing means for normally holding said shift limit of said engine brake range equal to a normal limit ratio and changing said shift limit to a modified limit ratio which is smaller than said normal limit ratio when the wheel deceleration is equal to or greater than the predetermined deceleration value, and said wheel deceleration is a rate of decrease of a drive wheel speed of the vehicle with respect to time; and wherein said shift controller comprises a limit restoring means for restoring said shift limit of said engine brake range from said modified limit ratio to said normal limit ratio when said engine brake range is not selected.

2. A shift control system according to claim 1 wherein said control system further comprises a shift position sensing means for sensing a shift position of said transmission and for producing a shift position signal representing said shift position; wherein said shift controller further comprises a condition discriminating means which produces a first condition signal when said shift position signal sent from said shift position sensing means is in a signal state indicating that said engine brake range is selected, and which produces a second condition signal when said wheel deceleration is equal to or greater than said predetermined deceleration value; and wherein said restoring means restores said shift limit of said engine brake range to said normal limit ratio when said first condition signal is absent, and said changing means changes said shift limit to said modified limit ratio when said first and second condition signals are both present.

3. A shift control system according to claim 1 wherein said modified limit ratio is equal to said minimum ratio.

4. A shift control system according to claim 1 wherein said modified limit ratio is determined in accordance with said wheel deceleration.

5. A shift control system according to claim 4 wherein said modified limit ratio is decreased when said wheel deceleration increases.

6. A shift control system according to claim 5 wherein an amount of reduction which is a difference between said normal limit ratio and said modified limit ratio is increased linearly with increase in a deviation of said wheel deceleration from said predetermined wheel deceleration value.

7. A shift control system according to claim 6 wherein said modified limit ratio of said engine brake range is equal to or greater than said minimum ratio, and said normal limit ratio is equal to or smaller than said maximum ratio, and said shift limit of said engine brake range is an upshift limit beyond which an automatic upshift of the transmission is prevented to obtain an engine braking effect.

8. A shift control system according to claim 1 wherein said modified limit ratio is set equal to a quotient resulting from division of said minimum ratio by a predetermined constant which is smaller than one and greater than zero.

9. A shift control system according to claim 8 wherein said predetermined constant is in a range of 0.7~0.9.

10. A shift control system according to claim 1 wherein said modified limit ratio is set equal to a quotient resulting from division of a dividend by a predetermined constant which is smaller than one and greater than zero, and said dividend is determined in accordance with said wheel deceleration.

11. A shift control system according to claim 10 wherein said dividend is decreased as said deceleration increases.

12. A shift control system according to claim 11 wherein an amount of reduction which is a difference between said normal limit ratio and said dividend is increased linearly with increase in a deviation of said wheel deceleration from said predetermined wheel deceleration value, and wherein said predetermined constant is equal to or greater than 0.7 and equal to or smaller than 0.9.

13. A shift control system according to claim 1 wherein said continuously variable transmission is a belt-type continuously variable transmission, and said shift controller comprises a storage device for storing said shift limit of said engine brake range.

14. A shift control system according to claim 1 wherein said wheel condition sensing means comprises left and right drive wheel speed sensors for sensing left and right drive wheel speeds of left and right drive wheels of the vehicle, and said shift controller comprises a drive wheel deceleration calculating means for determining a first deceleration which is a rate of decrease of the left drive wheel speed with respect to time, and a second deceleration which is a rate of decrease of the right drive wheel speed with respect to time, and determining said wheel deceleration which is equal to said first deceleration if said first deceleration is equal to or smaller than said second deceleration, and to said second deceleration if said second deceleration is smaller than said first deceleration.

15. A shift control system according to claim 1 wherein said modified limit ratio is such a value as to make a drive wheel speed of a drive wheel smaller than a vehicle body speed in a predetermined proportion.

16. A shift control system according to claim 15 wherein said modified limit ratio is set equal to a value to hold the drive wheel speed equal to a predetermined percentage of the vehicle body speed and said predetermined percentage is within a range of 70~90%.

17. A shift control system, comprising:

a continuously variable transmission; and a shift controller which controls a transmission ratio of said continuously variable transmission between a maximum ratio and a minimum ratio when a normal drive range is selected, and which, when an engine brake range is selected, prevents the transmission ratio from decreasing beyond a shift limit of the engine brake range which is greater than said minimum ratio;

wherein said shift control system further comprises a wheel condition sensing means for sensing a revolving condition of a wheel of a vehicle to determine a wheel deceleration, and said shift controller decreases said shift limit of said engine brake range when the wheel deceleration is equal to or greater than a predetermined deceleration value;

wherein said shift controller comprises a limit changing means for normally holding said shift limit of said engine brake range equal to a normal limit ratio and changing said shift limit to a modified limit ratio which is smaller than said normal limit ratio when the wheel deceleration is equal to or greater than the predetermined deceleration value, and said wheel deceleration is a rate of decrease of a drive wheel speed of the vehicle with respect to time; and wherein said transmission has a plurality of shift positions comprising a P position for parking, an R position for reverse, an N position for neutral, a D position for selecting said normal drive range, a second low speed position for selecting a second low speed range in which said transmission ratio is prevented from being decreased beyond a second shift limit to obtain an engine braking effect, and a first low speed position for selecting a first low speed range in which said transmission ratio is prevented from being decreased beyond a first shift limit to obtain the engine braking effect; and wherein said limit changing means of said shift controller normally holds said first and second shift limits equal to first and second normal limit ratios respectively, and changing said first and second shift limits to first and second modified limit ratios, respectively, when said wheel deceleration is equal to or greater than said predetermined wheel deceleration value, said first normal limit ratio is greater than said second normal limit ratio, said first modified limit ratio is smaller than said first normal limit ratio, and said second modified limit ratio is smaller than said second normal limit ratio.

18. A shift control system according to claim 17 wherein said first and second modified limit ratios of said first and second low speed ranges are equal to each other, and prevented from being decreased beyond said minimum ratio.

19. A shift control system, comprising:

a transmission system comprising a continuously variable transmission;

a sensing means comprising a vehicle condition sensing means for sensing a vehicle operating condition, a wheel condition sensing means for sensing a revolving condition of a wheel of a vehicle to determine a wheel deceleration and a shift position sensing means for sensing a shift position of said transmission by sensing a position of a movable member of said transmission system, and producing a shift position signal representing said shift position of said transmission, said shift position signal being in a first signal state when said movable member is in a position to select a normal drive range and in a second signal state when said movable member is in a position to select an engine brake range; and a shift controller for controlling a transmission ratio of said continuously variable transmission in accordance with said vehicle operating condition between a maximum ratio (Cmax) and a minimum ratio (Cmin) when said shift position signal is in said first signal state indicating said normal drive range, and for controlling the transmission ratio of said continuously variable transmission in accordance with said vehicle operating condition between said maximum ratio (Cmax) and a shift limit which is equal to or smaller than said maximum ratio when said shift position signal is in said second signal state indicating said engine brake range;

wherein said shift controller comprises a limit changing means for normally holding said shift limit of said engine brake range equal to a normal limit ratio (CLmin, C2min) and changing said shift limit to a modified limit ratio (C'Lmin, C'2min) which is smaller than said normal limit ratio when the wheel deceleration is equal to or greater than the predetermined deceleration value.

20. A shift control system according to claim 19 wherein said shift controller further comprises a condition discriminating means for producing a first condition signal when said shift position signal sent from said shift position sensing means is in said second signal state indicating that said engine brake range is selected, and for producing a second condition signal when said wheel deceleration is equal to or greater than said predetermined deceleration value; and wherein said limit changing means includes a means for changing said shift limit to said modified limit ratio only when said first and second condition signals are both present.

* * * * *